(12) United States Patent
Matono et al.

(10) Patent No.: US 7,885,036 B2
(45) Date of Patent: Feb. 8, 2011

(54) MAGNETIC DEVICE, PERPENDICULAR MAGNETIC RECORDING HEAD, MAGNETIC RECORDING SYSTEM, METHOD OF FORMING MAGNETIC LAYER PATTERN, AND METHOD OF MANUFACTURING PERPENDICULAR MAGNETIC RECORDING HEAD

(75) Inventors: Naoto Matono, Nagano (JP); Tatsuya Harada, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 941 days.

(21) Appl. No.: 11/708,609

(22) Filed: Feb. 21, 2007

(65) Prior Publication Data
US 2007/0195457 A1    Aug. 23, 2007

(30) Foreign Application Priority Data

Feb. 22, 2006   (JP)   ............................. 2006-045679
Nov. 22, 2006   (JP)   ............................. 2006-316149

(51) Int. Cl.
*G11B 5/147*   (2006.01)
*G11B 5/187*   (2006.01)

(52) U.S. Cl. ................................. 360/125.12
(58) Field of Classification Search ............ 360/125.02, 360/125.03, 125.1, 125.11, 125.13, 125.14, 360/125.15
See application file for complete search history.

(56) References Cited

U.S. PATENT DOCUMENTS

| | | | |
|---|---|---|---|
| 6,504,675 B1 * | 1/2003 | Murdock et al. ....... | 360/125.12 |
| 6,710,973 B2 | 3/2004 | Takano et al. | |
| 6,759,081 B2 | 7/2004 | Huganen et al. | |
| 7,139,153 B2 * | 11/2006 | Hsiao et al. ............. | 360/125.03 |
| 7,248,437 B2 * | 7/2007 | Yazawa et al. ......... | 360/125.12 |
| 7,336,442 B2 * | 2/2008 | Sasaki et al. ........... | 360/125.02 |

(Continued)

FOREIGN PATENT DOCUMENTS

JP    A 2001-323393    11/2001

(Continued)

OTHER PUBLICATIONS

ALD Atomic layer Deposition systems; Internet website Techscience Ltd. (www.techsc.co.jp); pp. 1-3; with partial translation.

*Primary Examiner*—Angel A. Castro
(74) *Attorney, Agent, or Firm*—Oliff & Berridge, PLC

(57) ABSTRACT

Provided is a method of manufacturing a perpendicular magnetic recording head which can enhance accuracy and simplify the manufacturing process. The method includes: forming a photoresist pattern having an opening part (the inclination of an inner wall); forming a non-magnetic layer (the inclination of another inner wall) so as to narrow the opening part by a dry film forming method such as ALD method; stacking a seed layer and a plating layer so as to bury the opening part provided with the non-magnetic layer; and forming a main magnetic pole layer (a front end portion having a bevel angle) by polishing the non-magnetic layer, the seed layer, and the plating layer by CMP method until the photoresist pattern is exposed. The final opening width (the forming width of the front end portion) is unsusceptible to variations, thus reducing the number of the steps of forming the main magnetic layer.

15 Claims, 16 Drawing Sheets

U.S. PATENT DOCUMENTS

| | | | |
|---|---|---|---|
| 7,375,925 B2* | 5/2008 | Sasaki et al. | 360/123.02 |
| 7,443,633 B2* | 10/2008 | Tagami et al. | 360/125.5 |
| 7,468,864 B2* | 12/2008 | Sasaki et al. | 360/125.12 |
| 7,518,824 B2* | 4/2009 | Sasaki et al. | 360/125.09 |
| 7,558,020 B2* | 7/2009 | Sasaki et al. | 360/125.14 |
| 2004/0156142 A1* | 8/2004 | Mochizuki et al. | 360/125 |
| 2006/0002014 A1* | 1/2006 | Sasaki et al. | 360/125 |

FOREIGN PATENT DOCUMENTS

| | | |
|---|---|---|
| JP | A 2002-092821 | 3/2002 |
| JP | A 2003-017474 | 1/2003 |

* cited by examiner

MAGNETIC DEVICE, PERPENDICULAR MAGNETIC RECORDING HEAD, MAGNETIC RECORDING SYSTEM, METHOD OF FORMING MAGNETIC LAYER PATTERN, AND METHOD OF MANUFACTURING PERPENDICULAR MAGNETIC RECORDING HEAD

BACKGROUND OF THE INVENTION

1. Field of the Invention

The present invention relates to a magnetic device, a perpendicular magnetic recording head performing the recording process of a perpendicular recording system, a magnetic recording system equipped with a perpendicular magnetic recording head, a method of forming a magnetic layer pattern, and a method of manufacturing a perpendicular magnetic recording head.

2. Description of the Related Art

As an application of a magnetic device provided with a magnetic layer, a thin film magnetic head to be equipped on a magnetic recording system such as a hard disk drive is widely used in the recent years. In the field of developing the thin film magnetic head, the recording density of a magnetic recording medium such as a hard disk (hereinafter referred to simply as a "recording medium") is far improved, and a still further improvement in performance is required, and therefore the recording system is changed from a longitudinal recording system to the perpendicular recording system. The perpendicular recording system has the advantages that a high line recording density can be obtained, and the recording medium after recording is unsusceptible to the influence of thermal fluctuation.

The thin film magnetic head of the perpendicular recording system (hereinafter referred to simply as a "perpendicular magnetic recording head") is provided with a thin film coil generating a magnetic flux, and a magnetic pole extending from an air bearing surface to rearward, and conducting the magnetic flux to the recording medium. In the perpendicular magnetic recording head, a recording medium can be magnetized by a magnetic field for recording (a perpendicular magnetic field), and therefore information can be recorded magnetically in the recording medium.

In the manufacturing process of the perpendicular magnetic recording head, it is necessary to narrow as much as possible a tip width (a trailing edge width) of the magnetic pole defining a recording track width in order to cope with an increase in surface recording density. As a method related to the method of narrowing the trailing edge width, there is known a method including the steps of: forming a photoresist pattern having an opening part; narrowing the opening part by forming an insoluble layer so as to cover the photoresist pattern; and then forming a plating layer at the opening part provided with the insoluble layer (for example, refer to Japanese Unexamined Patent Publication No. 2001-323393). There is also known a method including the steps of: forming a release layer and a photoresist pattern having an opening part in this order on a thin film; narrowing the opening part by forming an additional film so as to cover the photoresist pattern; and then forming a thin film pattern by etching the thin film by using, as a mask, the photoresist pattern and the additional film (for example, refer to Japanese Unexamined Patent Publication No. 2003-017474).

Besides the above-mentioned methods, there is known a method of forming a magnetic pole in the manufacturing process of a perpendicular magnetic recording head. That is, this method includes the steps of: forming a groove by etching an inorganic insulating film by using a photoresist pattern as a mask; removing the photoresist pattern; forming a stopper film and a magnetic film in this order so as to cover the inorganic insulating film; and then polishing the magnetic film until the stopper film is exposed (for example, refer to Japanese Unexamined Patent Publication No. 2002-092821). In this method, a main magnetic pole having a reverse trapezoidal cross section can be formed in the groove after polishing.

In the field of the latest device related manufacturing, ALD (atomic layer deposition) method is used as a film forming method extremely excellent in film thickness controllability (for example, refer to "ALD atomic layer deposition system," Techscience Ltd., Internet<URL: http://techsc.co.jp/products/mems/ALD.htm>). The ALD method is capable of forming an oxide film, a nitride film, or a metal film considerably thinly and densely under high temperature condition of 150° C. or above, and it is used in the field of manufacturing where physical characteristics such as dielectric strength is strictly required. In the field of manufacturing a thin film magnetic head, the ALD method is used in the step of forming a reproducing gap of a reproducing head (for example, refer to the specification of U.S. Pat. No. 6,759,081).

SUMMARY OF THE INVENTION

However, in consideration of the recent technical trend that the trailing edge width is being miniaturized up to about 0.2 µm or below, the above-mentioned methods of the related art are not completely satisfactory from the viewpoint of forming a magnetic pole with high accuracy and ease. Specifically, it is difficult for the method using the insoluble layer to strictly control the thickness of the insoluble layer, and hence the final opening width (the forming width of the plating layer) is liable to vary. On the other hand, the method using the release film and the additional film requires the step of forming the release film in addition to the step of forming the additional film, thus increasing the number of steps.

Meanwhile, the problem of so-called pole eraser is taken seriously in the recent years. The term "pole eraser" is a malfunction that, though the perpendicular magnetic recording head is in its non-recording state (non-energized state), the remaining magnetic flux in a magnetic pole performs overwriting in a recording medium thereby to unintentionally erase the information stored in the recording medium.

From the foregoing, in order to popularize the perpendicular magnetic recording head, it is important to establish a technique of miniaturizing the trailing edge width in terms of the manufacturing thereof, and establish a technique of suppressing the occurrence of the pole eraser in terms of the performance thereof.

In view of the above-mentioned problems, it is desirable to provide a magnetic device, a perpendicular magnetic recording head, a magnetic recording system, a method of forming a magnetic layer pattern, and a method of manufacturing a perpendicular magnetic recording head, each of which enables the manufacturing process to be performed with higher accuracy and simplified.

It is also desirable to provide a magnetic device, a perpendicular magnetic recording head, a magnetic recording system, a method of forming a magnetic layer pattern, and a method of manufacturing a perpendicular magnetic recording head, each of which enables operating characteristics to be stabilized.

Other and further objects, features and advantages of the invention will appear more fully from the following description.

A first magnetic device of the present invention includes: a first non-magnetic layer with U-shaped cross section; and a magnetic layer filling inside of the first non-magnetic layer.

In a second magnetic device of the present invention, the first non-magnetic layer contains no inert gas, while a second non-magnetic layer containing inert gas fills outside of the first non-magnetic layer.

A third magnetic device of the present invention further includes a second non-magnetic layer filling outside of the first non-magnetic layer. In such a case, in a direction to cross over a cross section of the first non-magnetic layer, the first non-magnetic layer is recessed from the second non-magnetic layer, and the magnetic layer projects from the first non-magnetic layer.

A first perpendicular magnetic recording head of the present invention includes: a first non-magnetic layer with U-shaped cross section; and a magnetic pole filling inside of the first non-magnetic layer.

In a second perpendicular magnetic recording head of the present invention, the first non-magnetic layer contains no inert gas, while a second non-magnetic layer containing inert gas fills outside of the first non-magnetic layer.

A third perpendicular magnetic recording head of the present invention further includes a second non-magnetic layer filling outside of the first non-magnetic layer. In such a case, in a direction to cross over a cross section of the first non-magnetic layer, the first non-magnetic layer is recessed from the second non-magnetic layer, and the magnetic pole projects from the first non-magnetic layer.

A magnetic recording system of the present invention includes: a recording medium; and a perpendicular magnetic recording head as described above.

As used herein, the term "U-shaped cross section" means, in a restricted sense, the cross-sectional shape expressed by the contour part of the alphabet letter "U". Here, the term "cross-sectional shape" signifies the cross-sectional shape of an instrumental die. From this, the term "U-shaped cross section" includes, in its wide sense, not only the cross-sectional shape expressed by the alphabet letter "U", but also the cross-sectional shapes expressed by substantially letter "U" such as the alphabet letter "V" and the like.

A method of forming a magnetic layer pattern of the present invention includes: a first step of forming on a base a photoresist pattern having an opening part; a second step of forming a first non-magnetic layer so as to narrow the opening part by covering at least an inner wall of the photoresist pattern in the opening part; a third step of forming a magnetic layer so as to fill at least the opening part provided with the first non-magnetic layer; and a fourth step of forming a magnetic layer pattern at the opening part by selectively removing the first non-magnetic layer and the magnetic layer until at least the photoresist pattern is exposed.

A method of manufacturing a perpendicular magnetic recording head of the present invention includes: a first step of forming on a base a photoresist pattern having an opening part; a second step of forming a first non-magnetic layer so as to narrow the opening part by covering at least an inner wall of the photoresist pattern in the opening part; a third step of forming a magnetic layer so as to fill at least the opening part provided with the first non-magnetic layer; and a fourth step of forming a magnetic pole at the opening part by selectively removing the first non-magnetic layer and the magnetic layer until at least the photoresist pattern is exposed.

In the first magnetic device or the method of forming a magnetic layer pattern of the present invention, by using the first non-magnetic layer formed by the dry film forming method excellent in film thickness controllability, in order to narrow the opening part of the photoresist pattern, the final opening width (the forming width of the magnetic layer pattern) is less susceptible to variations than the case of the related art using the insoluble layer whose film thickness is hard to control. Additionally, the formation of the magnetic layer pattern requires only the step of forming the first non-magnetic layer as a film forming process. This enables the number of steps to be reduced than the case of the related art requiring the step of forming the release film in addition to the step of forming the additional film. These are true for the cases where the first magnetic device or the method of forming a magnetic layer pattern is applied to the first perpendicular magnetic recording head or the manufacturing method thereof, or the magnetic recording system.

In the second or third magnetic device or the second or third perpendicular magnetic recording head of the present invention, the first non-magnetic layer contains no inert gas, and the second non-magnetic layer contains inert gas. Whether the inert gas is present or not depends on, for example, that the first non-magnetic layer is formed by a film forming method using no inert gas, such as ALD method, and the second non-magnetic layer is formed by a film forming method using inert gas, such as sputtering method. In this case, for example, when the film forming temperature (so-called substrate temperature) in the ALD method is lower than a general film forming temperature (about 150° C.), specifically, than the glass transition temperature of the photoresist pattern used for forming the magnetic layer or the magnetic pole, there occurs a difference in hardness between the first and second non-magnetic layers, so that the first non-magnetic layer can be recessed from the second non-magnetic layer in a direction to cross over the cross section of the first non-magnetic layer. Thus, as compared with the case where the first non-magnetic layer is not recessed from the second non-magnetic layer, the area where the first non-magnetic layer contacts with the magnetic layer or the magnetic pole can be decreased, thereby reducing the influence of the residual stress of the first non-magnetic layer to be exerted thereon. Particularly, for example, when the magnetic layer or the magnetic pole constructed of a magnetic material has tensile stress, and the first and second non-magnetic layer constructed of a non-magnetic material have compressive stress, a part of the magnetic layer or the magnetic pole which is not contacted with the first non-magnetic layer becomes a stress free state (the state being unsusceptible to the influence of the compressive stress), and therefore this part is susceptible to only the influence of tensile stress. As the result, the magnetic domain structure of the magnetic layer or the magnetic pole is hard to be fixed, and hence the initial magnetic domain structure can be maintained. These are true for the cases where the second or third magnetic device or the second or third perpendicular magnetic recording head is applied to the magnetic recording system.

In the first magnetic device or the perpendicular magnetic recording head of the present invention, the magnetic layer or the magnetic pole may include a seed layer and a plating layer formed on the seed layer. Preferably, the non-magnetic layer is formed by ALD method.

In the third magnetic device or the perpendicular magnetic recording head of the present invention, the magnetic layer or the magnetic pole may be recessed or may project than the second non-magnetic layer.

In the first perpendicular magnetic recording head of the present invention, the magnetic pole may extend from an air bearing surface or its neighborhood to an area far therefrom, and an end surface of the magnetic pole on the side close to the air bearing surface may be of reverse trapezoidal shape. The term "reverse trapezoidal shape" means a trapezoidal shape whose upper bottom and lower bottom are a longer side locating on the trailing side and a shorter side locating on the leading side, respectively.

In the method of forming a magnetic layer pattern or the method of manufacturing a perpendicular magnetic recording head, it is preferable that in the second step, the first non-magnetic layer is formed by ALD method, and the film forming temperature of the ALD method is controlled to be lower than the glass transition temperature of the photoresist pattern. In the fourth step, the first non-magnetic layer and the magnetic layer may be removed by polishing. In an alternative, the method may further include a fifth step of removing the remaining photoresist pattern; a sixth step of forming a second non-magnetic layer so as to cover the first non-magnetic layer and the magnetic pole; and a seventh step of selectively removing the second non-magnetic layer until at least the first non-magnetic layer and the magnetic pole are exposed. In another alternative, in the third step, the magnetic layer may be formed by forming a seed layer on the first non-magnetic layer, and then growing a plating layer on the seed layer.

In the magnetic recording system of the present invention, it is preferable that the recording medium includes a magnetizing layer and a soft magnetic layer disposed on a close side and a far side with respect to the perpendicular magnetic recording head, respectively.

With the first magnetic device, the first perpendicular magnetic recording head, the magnetic recording system, the method of forming a magnetic layer pattern, or the method of manufacturing a perpendicular magnetic recording head, the manufacturing process can be performed with higher accuracy and simplified because the first non-magnetic layer is formed so as to narrow the opening part by covering at least the inner wall of the photoresist pattern in the opening part, and the magnetic layer is formed so as to fill at least the opening part provided with the first non-magnetic layer, and then the first non-magnetic layer and the magnetic layer are selectively removed until at least the photoresist pattern is exposed.

With the second or third magnetic device, the second or third perpendicular magnetic recording head, or the magnetic recording system, by the presence of the first non-magnetic layer containing no inert gas and the second non-magnetic layer containing the inert gas, the first non-magnetic layer can be recessed from second non-magnetic layer. This enables operating characteristic to be stabilized.

DESCRIPTION OF THE PREFERRED EMBODIMENTS

Preferred embodiments of the present invention will now be described in detail with reference to the accompanying drawings.

Figures 1A, 1B:
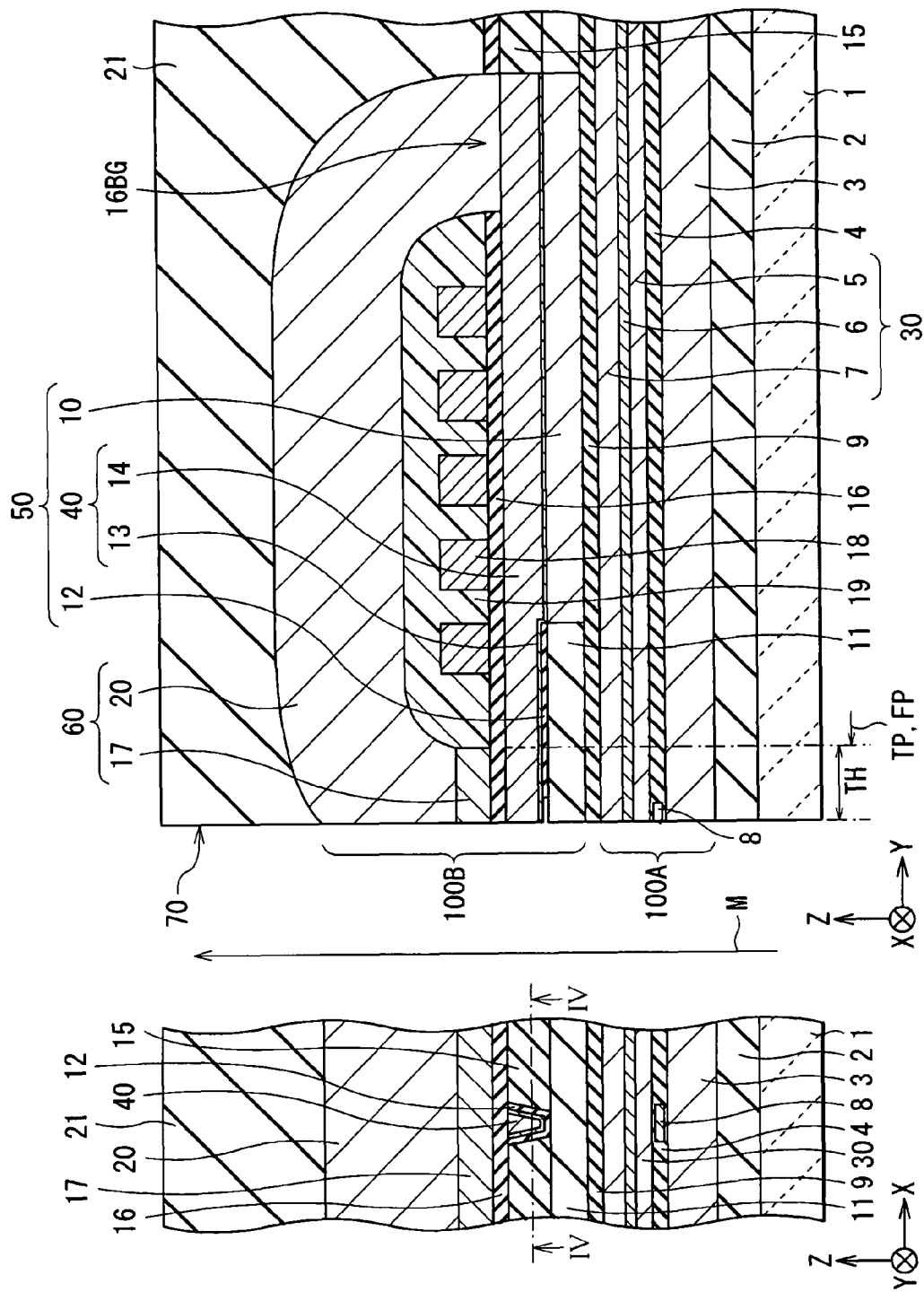
FIGS. 1A and 1B are sectional views each showing the sectional configuration of a thin film magnetic head equipped with a perpendicular magnetic recording head according to a preferred embodiment of the present invention.
Figure 2:
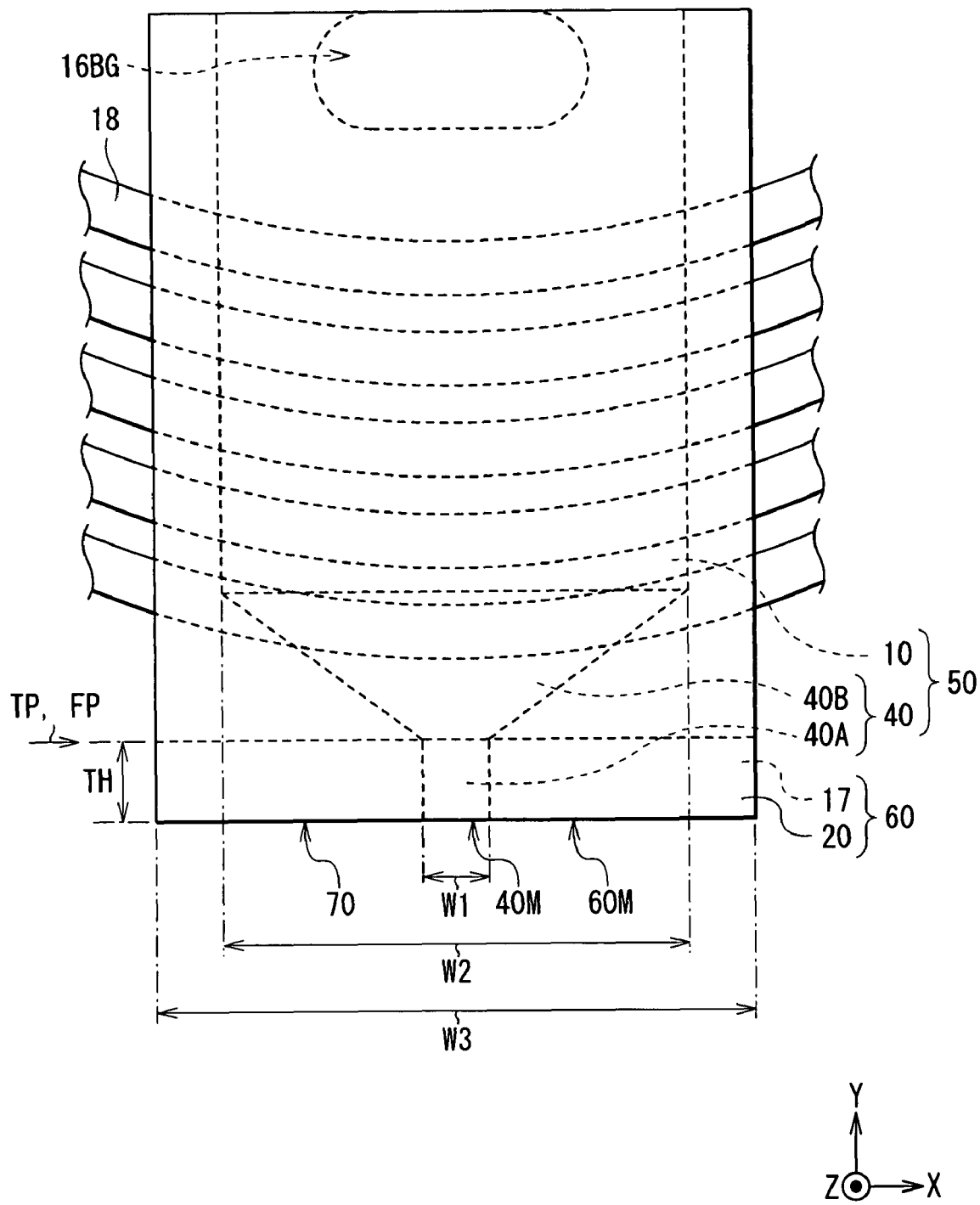
FIG. 2 is a plan view showing the plan configuration of a key part of the thin film magnetic head shown in FIGS. 1A and 1B.
Figure 3:
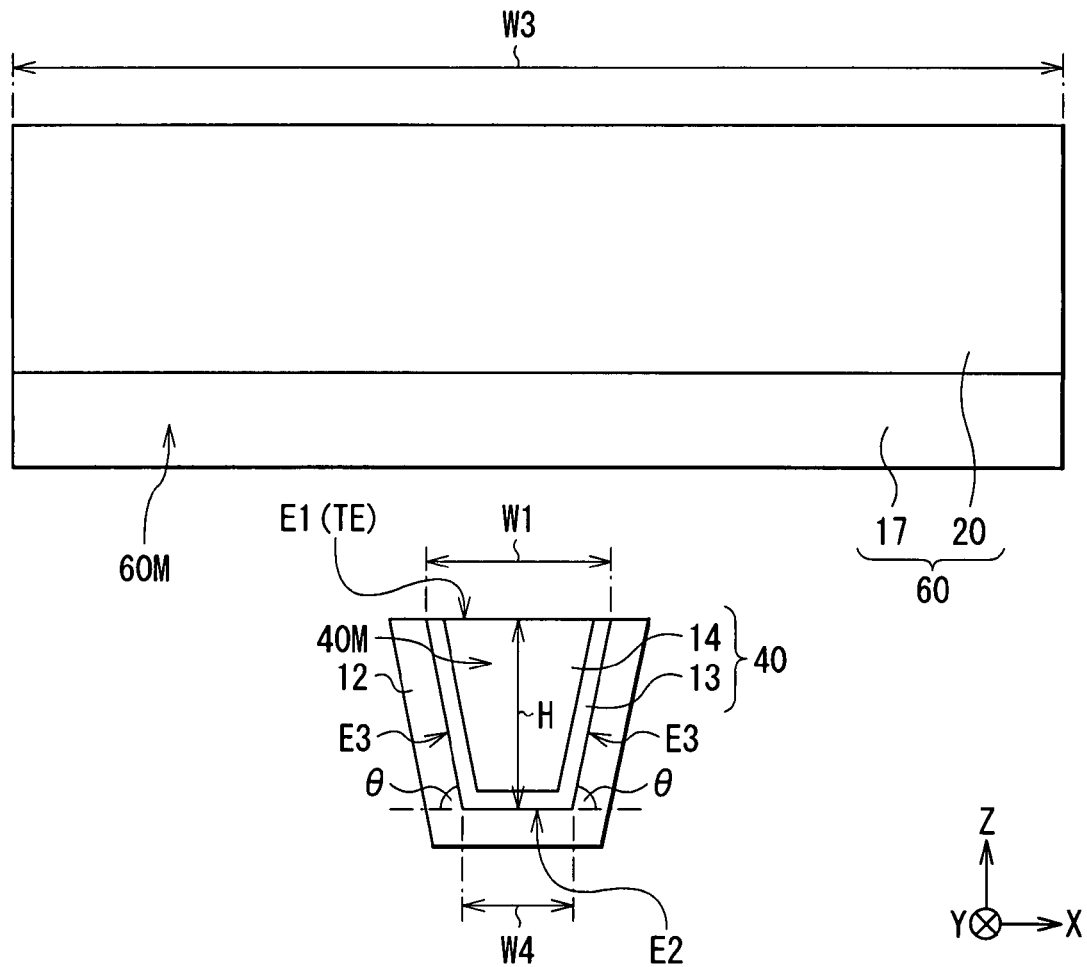
FIG. 3 is a plan view showing in enlarged dimension the configuration of an end surface in the key part of the thin film magnetic head shown in FIGS. 1A and 1B.
Figure 4:
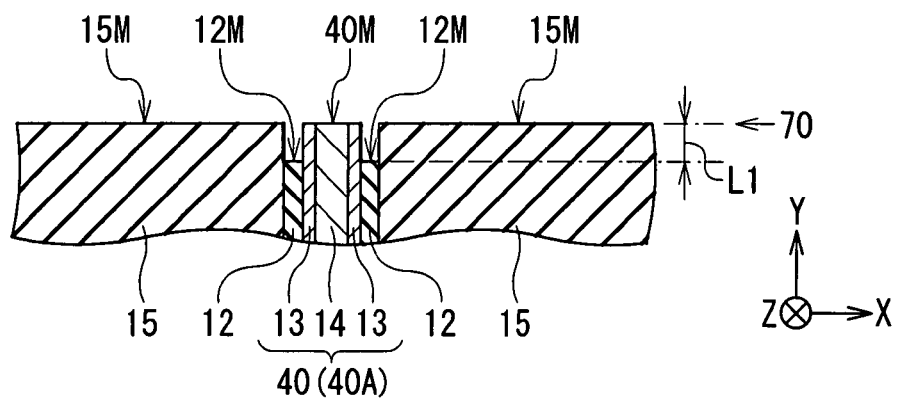
FIG. 4 is a sectional view showing the sectional configuration of the key part of the thin film magnetic head shown in FIGS. 1A and 1B.
Figure 5:
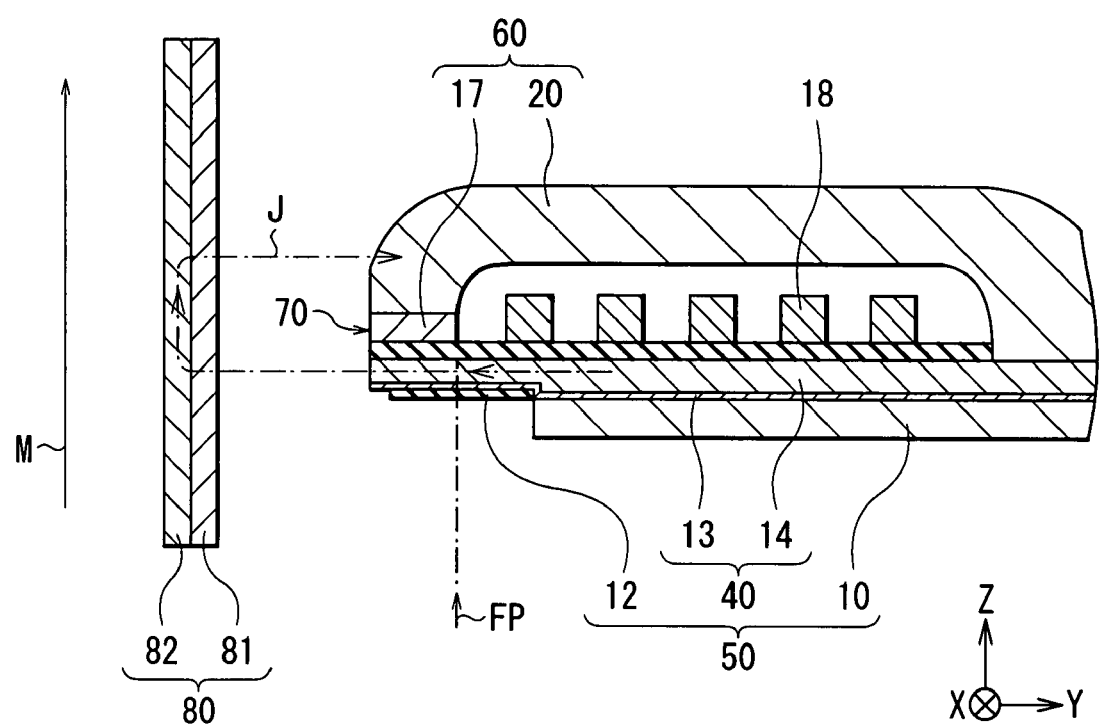
FIG. 5 is another sectional view showing the sectional configuration of the key part of the thin film magnetic head shown in FIGS. 1A and 1B.

First, the configuration of a thin film magnetic head provided with a perpendicular magnetic recording head according to a preferred embodiment of the present invention will be described below. FIGS. 1A to 5 show the configuration of the thin film magnetic head. Specifically, FIGS. 1A and 1B show the overall sectional configuration, particularly showing a cross section parallel to an air bearing surface 70, and a cross section perpendicular to the air bearing surface 70, respectively. FIG. 2 shows the plan configuration of a key part. FIG. 3 shows in enlarged dimension the configuration of an end surface of the key part. FIGS. 4 and 5 show the sectional configuration of the key part, and particularly FIG. 4 shows a cross section taken along the line IV-IV in FIG. 1A. Since a magnetic device of the present invention is applied to a thin film magnetic head as an example, the magnetic device will be described together in the following.

In the following description, the dimensions in X-, Y-, and Z-axis directions shown in FIGS. 1A to 5 are expressed by "width," "length," and "thickness or height," respectively. In the Y-axis direction, the side close to the air bearing surface 70 and the side far therefrom are expressed by "forward" and "rearward," respectively, and locating forward and locating rearward are expressed by "project" and "be recessed," respectively. These are true for FIG. 6 and the succeeding figures.

The thin film magnetic head performs a magnetic process to a recording medium 80 shown in FIG. 5 (for example, a hard disk), and it is, for example, a composite head capable of performing both of recording process and reproducing process as the magnetic process. As shown in FIGS. 1A and 1B, this thin film magnetic head is comprised of, for example, an insulating layer 2, a reproducing head part 100A performing the reproducing process by using MR (magneto-resistive) effect, a separating layer 9, a recording head part 100B performing the recording process of perpendicular recording system, and an overcoat layer 21, all of which are stacked in the order named on a substrate 1. The substrate 1 is formed of a ceramic material such as aluminium oxide titanium carbonate ($Al_2O_3 \cdot TiC$). The insulating layer 2, the separating layer 9, and the overcoat layer 21 are formed of, for example, a non-magnetic insulating material such as aluminium oxide ($Al_2O_3$, hereinafter referred to simply as "alumina").

The reproducing head part 100A is comprised of a lower lead shield layer 3, a shield gap film 4, and an upper lead shield layer 30, all of which are stacked in this order. A reproducing element (an MR element 8) is buried in the shield gap film 4 so as to be exposed to the air bearing surface 70 opposed to the recording medium 80. The air bearing surface 70 can be defined uniquely by employing, as a reference, one end surface of the substrate 1 (the left end surface as viewed in FIG. 1B), supporting a series of components, from the insulating layer 2 to the overcoat layer 21. That is, the air bearing surface 70 is a surface including one end surface of the substrate 1.

The lower lead shield layer 3 and the upper lead shield layer 30 separate magnetically the MR element 8 from its surroundings, and extend rearward from the air bearing surface 70. For example, the lower lead shield layer 3 is formed of a magnetic material such as nickel ferroalloy (NiFe (e.g., 80 weight % of nickel and 20 weight % of iron), hereinafter referred to simply as "permalloy (product name)"). The upper lead shield layer 30 is comprised of two upper lead shield layer portions 5 and 7, which are stacked with a non-magnetic layer 6 interposed therebetween. Each of the upper lead shield layer portion 5 and 7 is formed of a magnetic material such as "permalloy." The non-magnetic layer 6 is formed of a non-magnetic material such as ruthenium (Ru) or alumina. The upper lead shield layer 30 is not necessarily required to have a stacked structure, and it may have a single-layer structure.

The shield gap film 4 separates electrically the MR element 8 from its surroundings, and is formed of a non-magnetic insulating material such as alumina. The MR element 8 utilizes GMR (giant magneto-resistive) effect or TMR (tunneling magneto-resistive) effect.

The recording head part 100B is a perpendicular magnetic recording head, so-called shield type head, comprised of a magnetic pole layer 50 whose periphery is filling with non-magnetic layers 11 and 15, a gap layer 16 provided with an opening part for magnetic joining (a back gap 16BG), a thin film coil 18 filling with the insulating layer 19, and a magnetic layer 60, all of which are stacked in the order named.

The magnetic pole layer 50 conducts a magnetic flux to the recording medium 80 and extends rearward, for example, from the air bearing surface 70. The magnetic pole layer 50 is comprised of an auxiliary magnetic pole layer 10, a non-magnetic layer 12, and a main magnetic pole layer 40, all of which are stacked in this order.

The auxiliary magnetic pole layer 10 is an accommodating part of a main magnetic flux and extends, for example, from a position recessed from the air bearing surface 70 to the back gap 16BG. For example, the auxiliary magnetic pole layer 10 is disposed on the leading side with respect to the main magnetic pole layer 40, and has a rectangular plan shape (a width W2) as shown in FIG. 2. The non-magnetic layer 11 separates electrically and magnetically the auxiliary magnetic pole layer 10 from its surroundings, and it is formed of a non-magnetic insulating material such as alumina.

The non-magnetic pole layer 12 is a first non-magnetic layer separating electrically and magnetically the main magnetic pole layer 40 from its surroundings. For example, in order to allow the auxiliary magnetic pole layer 10 and the main magnetic pole layer 40 to be connected to each other, the non-magnetic layer 12 extends from the air bearing surface 70 to the foremost end position of the auxiliary magnetic layer 10, and is formed of a non-magnetic insulating material such as alumina or aluminium nitride. The range of extension of the non-magnetic layer 12 can be set arbitrarily. The cross section of the non-magnetic layer 12 parallel to the air bearing surface 70 is U-shaped, as shown in FIG. 1A, and the main magnetic pole layer 40 (a front end portion 40A to be described later) fills inside of the non-magnetic layer 12. In particular, the non-magnetic layer 12 is, for example, formed by ALD method, and has a uniform thickness along the surroundings of the main magnetic pole layer 40 (its lower surface and both side surfaces). In FIG. 2, the non-magnetic layer 12 is not shown.

The non-magnetic pole layer 15 is a second non-magnetic layer separating electrically and magnetically the main magnetic pole layer 40 from its surroundings. The main magnetic pole layer 40 (the front end portion 40A) fills inside of the non-magnetic layer 12 whose cross-sectional shape is like letter U, whereas the non-magnetic layer 15 fills outside of the non-magnetic layer 12, and formed of a non-magnetic insulating material such as alumina.

Although the non-magnetic layers 12 and 15 are formed of the non-magnetic insulating material, they have different compositions from each other because they employ different forming methods. That is, the non-magnetic layer 15 is formed by sputtering method using inert gas, and hence contains the inert gas. For example, the inert gas is argon (Ar), krypton (Kr), or xenon (Xe). In contrast, the non-magnetic layer 12 is formed by ALD method using no inert gas, and hence contains no inert gas. It is possible to determine whether the non-magnetic layers 12 and 15 contain any inert gas or not, by using component analysis method such as scanning transmission electron microscopy (STEM) or energy-dispersive X-ray spectroscopy (EDS).

The non-magnetic layers 12 and 15 have different amounts of a specific component due to the above-mentioned different forming methods. That is, the ALD method uses water and trimethyl aluminium (TMA), whereas the sputtering method uses neither water nor the like. Therefore, the content of hydrogen (H) in the non-magnetic layer 12 is larger than that in the non-magnetic layer 15.

The main magnetic pole layer 40 is a main releasing part of a magnetic flux and extends, for example, from the air bearing surface 70 to the back gap 16BG. As shown in FIG. 2, the main magnetic pole layer 40 has a plan shape of substantially a strap type as a whole, and includes in sequence from the air bearing surface 70, a front end portion 40A extending rearward from the air bearing surface 70, and a rear end portion 40B connected to the rear of the front end portion 40A. The front end portion 40A is substantially the releasing part of a magnetic flux (so-called magnetic pole), and has a regular width W1 defining a recording track width. The rear end portion 40B is a portion for supplying a magnetic flux to the front end portion 40A, and has a width W2 larger than the width W1. For example, the width of the rear end portion 40B is regular (the width W2) in the rear, and gradually narrowed in the front as it approaches the front end portion 40A. The position where the main magnetic pole layer 40 starts to increase in width from the width W1 to the width W2 is a so-called flare point FP.

As shown in FIG. 3, an end surface 40M of the main magnetic pole layer 40 on the side close to the air bearing surface 70 is of a reverse trapezoidal shape (a height H), whose upper bottom and lower bottom are a longer side locating on the trailing side and a shorter side locating on the leading side, respectively. Specifically, the end surface 40M has a shape defined by an upper edge E1 (a width W1) locating on the trailing side, a lower edge E2 (a width W4) locating on the leading side, and two side edges E3. The width W4 is smaller than the width W1. The upper edge E1 is substantially the recording point in the magnetic pole layer 50, and the width W1 is about 0.2 μm or below. The bevel angle θ of the end surface 40M (the angle formed between the direction of extension of the lower edge E2 and the side edge 3E) can be set arbitrarily, for example, within a range of below 90 degrees.

Here, the main magnetic pole layer 40 includes a seed layer 13 and a plating layer 14 formed on the seed layer 13. The seed layer 13 is used to grow the plating layer 14 in the manufacturing process of the thin film magnetic head, and formed of, for example, the same magnetic material as the plating layer 14. The plating layer 14 is formed of a high-saturation magnetic flux density material such as iron nickel alloy (FeNi) or ferroalloy. Examples of the ferroalloy are iron cobalt alloy (FeCo) and iron cobalt nickel alloy (FeCoNi).

The positional relationship between the main magnetic pole layer 40 and the non-magnetic layers 12 and 15 in the vicinity of the air bearing surface 70 is, for example, as shown in FIG. 4. An end surface 15M of the non-magnetic layer 15 on the side close to the air bearing surface 70 is located on the air bearing surface 70, whereas an end surface 12M of the non-magnetic layer 12 on the side close to the air bearing surface 70 is not located on the air bearing surface 70. That is, the non-magnetic layer 12 is recessed from the non-magnetic layer 15 in the direction to cross over the cross section of the non-magnetic layer 12. A recessing distance L1 of the non-magnetic layer 12 (a distance between the air bearing surface 70 and the front end of the non-magnetic layer 12) can be set arbitrarily. As an example, it is about a several nm. Like the end surface 15M of the non-magnetic layer 15, the end surface 40M of the main magnetic pole layer 40 is located on the air bearing surface 70. That is, the main magnetic pole layer 40 projects from the non-magnetic layer 12. The positional relationship between the main magnetic pole layer 40 and the non-magnetic layers 12, 15 can be specified by using surface observation means such as atomic force microscope (AFM).

The gap layer 16 is a gap for magnetically separating the magnetic pole layer 50 and the magnetic layer 60, and is formed of a non-magnetic insulating material such as alumina, or a non-magnetic conductive material such as ruthenium. The thickness of the gap layer 16 is about 0.03 μm to 0.1 μm.

The thin film coil 18 generates a magnetic flux, and is formed of a high conductive material such as copper (Cu). The thin film coil 18 has a winding structure (a spiral structure) wound around the back gap 16BG, as shown in FIGS. 1A to 2.

The insulating layer 19 separates electrically the thin film coil 18 from the surroundings thereof, and is formed of a non-magnetic insulating material such as photoresist or spin on glass (SOG), each exhibiting flowability during heating. The foremost end position of the insulating layer 19 is a throat height zero position TP. The distance between the throat height zero position TP and the air bearing surface 70 is a throat height TH. In FIGS. 1A, 1B, and FIG. 2, there is shown the case where the throat height zero position TP agrees with the flare point FP.

The magnetic layer 60 increases the gradient of a perpendicular magnetic field by incorporating the spreading component of a magnetic flux before recording (a magnetic flux to be released from the magnetic pole layer 50 to the recording medium 80), and also circulates the magnetic flux between the recording head part 100B and the recording medium 80 by incorporating a magnetic flux after recording (a magnetic flux returning from the recording medium 80 to the thin film magnetic head). The magnetic layer 60 extends rearward from the air bearing surface 70 on the trailing side of the magnetic pole layer 50, so that it can be separated from the magnetic pole layer 50 by the gap layer 16 in the front, and connected to the magnetic pole layer 50 through the back gap layer 16 in the rear. An end surface 60M of the magnetic layer 60 on the side close to the air bearing surface 70 is, for example, a rectangular shape having a width W3 larger than the width W1, as shown in FIG. 3. The magnetic layer 60 includes, for example, a light shield layer 17 and a return yoke layer 20 separating from each other.

The light shield layer 17 functions mainly to increase the gradient of a perpendicular magnetic field, and is formed of a high-saturation magnetic flux density material such as parmalloy or ferroalloy. In particular, by incorporating the spreading component of a magnetic flux released from the magnetic pole layer 50, the light shield layer 17 functions to (i) increase the magnetic field gradient of a perpendicular magnetic field; (ii) narrow the recording width; and (iii) incorporate an oblique magnetic field component into the perpendicular magnetic field. Like the return yoke layer 20, the light shield layer 17 may function to circuit a magnetic flux in some cases. For example, as shown in FIGS. 1A and 1B, the light shield layer 17 extends rearward from the air bearing surface 70, while being adjacent to the gap layer 16. The light shield layer 17 is adjacent to the insulating layer 19 in the rear end thereof. Thus, the light shield layer 17 functions to define the foremost end position of the insulating layer 19 (the throat height zero position TP).

The return yoke layer 20 functions to circuit a magnetic flux, and is formed of the same magnetic material as the light shield layer 17, for example. As shown in FIGS. 1A and 1B, the return yoke layer 20 extends from the air bearing surface 70 through above the insulating layer 19 to the back gap 16BG on the trailing side of the light shield layer 17, so that it can be connected to the light shield layer 17 in the front, and connected through the back gap 16BG to the magnetic pole layer 50 in the rear.

The overcoat layer 21 protects the thin film magnetic head, and is formed of a non-magnetic insulating material such as alumina.

The recording medium 80 includes, for example, a magnetizing layer 81 and a soft magnetic layer 82 disposed on the side close to and the side far from the thin film magnetic head, respectively, as shown in FIG. 5. The magnetizing layer 81 is one in which information can be recorded magnetically. The soft magnetic layer 82 functions as a pass of a magnetic flux (a so-called flux pass) in the recording medium 80. This type of the recording medium 80 is generally referred to as two-layer recording medium for perpendicular recording. Of course, the recording medium 80 may include a different layer in addition to the above-mentioned magnetizing layer 81 and the soft magnetic layer 82.

The upward arrows shown in FIGS. 1A and 1B, and FIG. 5 indicate an advance direction M in which the recording medium 80 moves relatively to the thin film magnetic head. The above-mentioned "trailing side" means, when the state of the recording medium 80 moving in the advance direction M is regarded as a flow, the side on which the flow runs out (the forward side in the advance direction M), namely the upper side in the thickness direction (the Z-axis direction) in this case. On the other hand, the side on which the flow runs in (the rear side in the advance direction M) is referred to as "leading side," namely the lower side in the thickness direction in this case. The upper edge E1 as the recording point in the main magnetic pole layer 40 is referred to as trailing edge TE, and its width W1 is referred to as trailing edge width.

The operation of the thin film magnetic head will be described below. That is, when a current flows from the external circuit (not shown) to the thin film coil 18 of the recording head part 100B during the time of recording information, a magnetic flux J for recording is generated. The magnetic flux J is accommodated in the auxiliary magnetic pole layer 10 and the main magnetic pole layer 40 in the magnetic pole layer 50, and then it flows to the front end portion 40A. At this time, the magnetic flux J is narrowed at the flare point FP, thereby being focused and finally collected in the vicinity of the trailing edge TE. When the magnetic flux J collected in the vicinity of the trailing edge TE is released to the outside thereby to generate a perpendicular magnetic field, the magnetizing layer 81 can be magnetized by the perpendicular magnetic field, thus enabling information to be recorded magnetically in the recording medium 80.

In this case, the spreading component of the magnetic flux J can be incorporated into the light shield layer 17, thereby increasing the gradient of the perpendicular magnetic field. The magnetic flux J incorporated into the light shield layer 17 is then resupplied through the return yoke layer 20 to the magnetic pole layer 50.

The magnetic flux J released from the magnetic pole layer 50 to the recording medium 80 magnetizes the magnetizing layer 81, and it is then incorporated through the soft magnetic layer 82 to the return yoke layer 20. At this time, a part of the magnetic flux J can also be incorporated into the light shield layer 17. The magnetic flux J incorporated into the light shield layer 17 and the return yoke layer 20 is also resupplied to the magnetic pole layer 50. This configures a magnetic circuit because the magnetic flux J circulates between the recording head part 100B and the recording medium 80.

On the other hand, at the time of reproducing information, when a sense current flows to the MR element 8 of the reproducing head part 100A, the resistance value of the MR element 8 changes in response to a signal magnetic field for reproduction from the recording medium 80. By detecting the resistance change as a voltage change, the information recorded in the recording medium 80 can be reproduced magnetically.

A method of manufacturing a thin film magnetic head will next be described. FIGS. 6 to 13 are for purposes of explaining a manufacturing process of a thin film magnetic head, each showing in enlarged dimension the sectional configuration corresponding to FIG. 1A.

First of all, the outline of the manufacturing process of the entire thin film magnetic head will be described with reference to FIGS. 1A and 1B, then the process of forming a key part to which applied is a method of manufacturing the perpendicular magnetic recording head according to the preferred embodiment of the present invention will be described with reference to FIGS. 1A and 1B to FIGS. 13A to 13B. Since the materials, dimensions, and structures of a series of components constituting the thin film magnetic head have already been described in detail, the descriptions corresponding to these will be omitted in the following. Since a method of forming a magnetic layer pattern of the present invention is applied to a method of manufacturing a perpendicular magnetic recording head as an example, the method of forming a magnetic layer pattern will be described together in the following.

The thin film magnetic head can mainly be manufactured by stacking in sequence a series of components by using any one of the existing thin film processes such as a film forming technique represented by plating method or sputtering method; a patterning technique represented by photolithography method; an etching technique represented by dry etching method or wet etching method; and a polishing technique represented by chemical mechanical polishing (CMP). That is, when manufacturing the thin film magnetic head, as shown in FIGS. 1A and 1B, a reproducing head part 100A is firstly formed by forming an insulating layer 2 on a substrate 1, and then stacking a lower lead shield layer 3, a shield gap film 4 with an MR element 8 buried therein, and an upper lead shield layer 30 (upper lead shield layer portions 5 and 7, and a non-magnetic layer 6) in the order named on the insulating layer 2. Subsequently, a recording head part 100B is formed by forming a separating layer 9 on the reproducing head part 100A, and stacking a magnetic pole layer 50 (an auxiliary magnetic pole layer 10, a non-magnetic layer 12, and a main magnetic pole layer 40), the periphery of which is buried with non-magnetic layers 11 and 15, a gap layer 16, a thin film coil 18 buried with an insulating layer 19, and a magnetic layer 60 (a light shield layer 17 and a return yoke layer 20) in the order named on the separating layer. The thin film magnetic head can be completed by forming an overcoat layer 21 on the recording head part 100B, and then forming an air bearing surface 70 by using mechanical process and polishing process.

Figure 6:
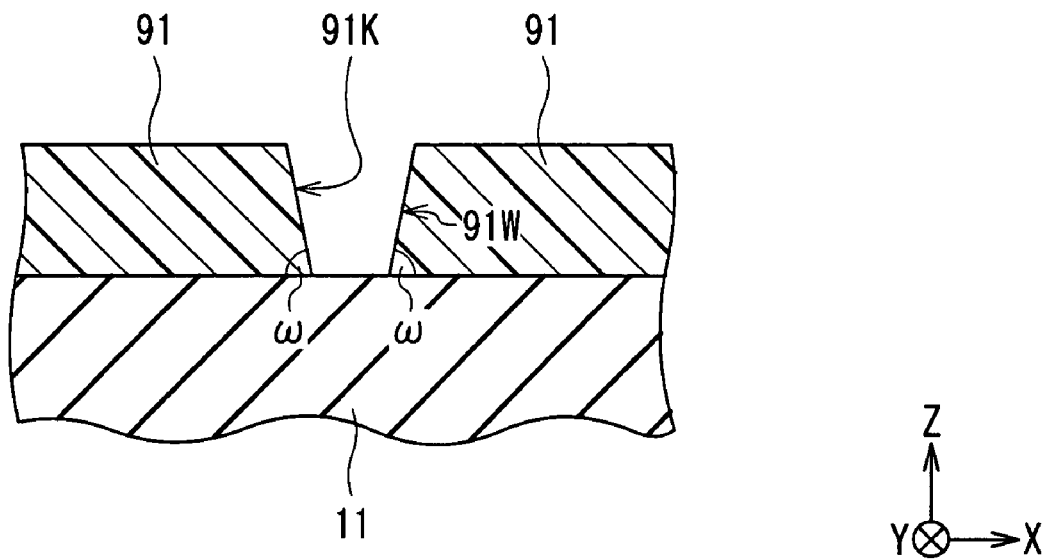
FIG. 6 is a sectional view for explaining a manufacturing step in a method of manufacturing a thin film magnetic head equipped with a perpendicular magnetic recording head according to the preferred embodiment of the present invention.

When forming the key part of the thin film magnetic head, a non-magnetic layer 11 is formed as a base, and thereafter, as shown in FIG. 6, a photoresist pattern 91 having an opening part 91K is formed on the non-magnetic layer 11. When forming the photoresist pattern 91, a photoresist film is formed by applying a photoresist to the surface of the non-magnetic layer 11, and the photoresist film is then subjected to patterning (exposure and development) by using photolithography method. In this case, the exposure condition is adjusted so that, as the opening part 91K is spaced apart from the non-magnetic layer 11, the opening part 91K is gradually widened and the inclination ω of an inner wall 91W (an angle formed between the inner wall 91W and the surface of the non-magnetic layer 11) is equal to a bevel angle θ (refer to FIG. 3).

Figure 7:
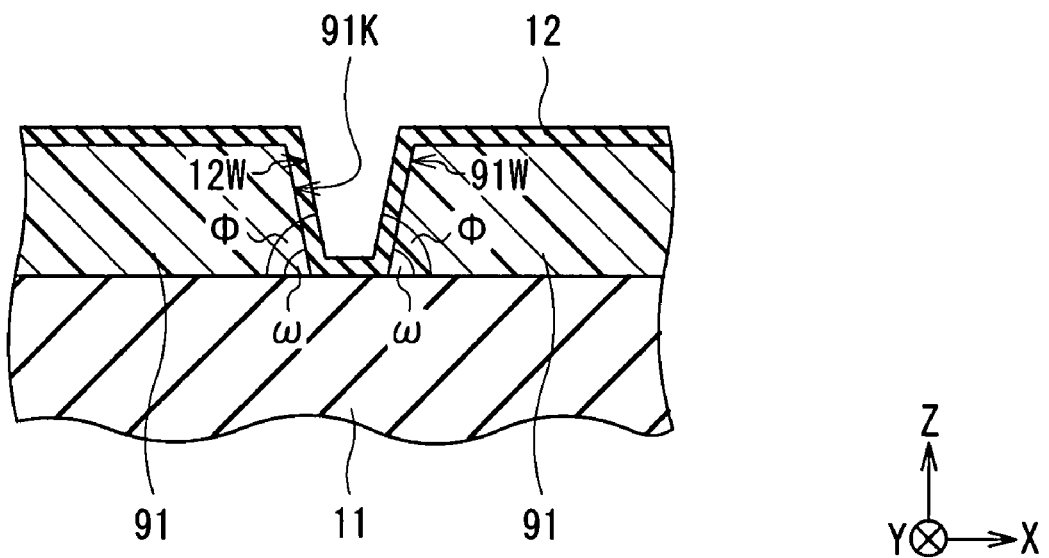
FIG. 7 is a sectional view for explaining the next following step of that shown in FIG. 6.

Subsequently, as shown in FIG. 7, a non-magnetic layer 12 is formed so as to narrow the opening part 91K by covering at least the inner wall 91W of the photoresist pattern 91 in the opening part 91K by using dry film forming method. When forming the non-magnetic layer 12, for example, ALD method is used to cover the surface of the photoresist pattern 91 (including the inner wall 91W) and the exposed surface of the non-magnetic layer 11 in the opening part 91K. In this case, it is particularly controlled so that the film forming temperature (so-called substrate temperature) of the ALD method is lower than the deformation temperature (the glass transition temperature) of the photoresist pattern 91. By using the ALD method, the inner wall 91W can be covered with the non-magnetic layer 12 of a uniform thickness, and hence the inclination Φ of the inner wall 12W of the non-magnetic layer 12 corresponding to the inner wall 91W (the angle formed between the inner wall 12W and the surface of the non-magnetic layer 11) can be equal to an inclination co.

Figure 8:
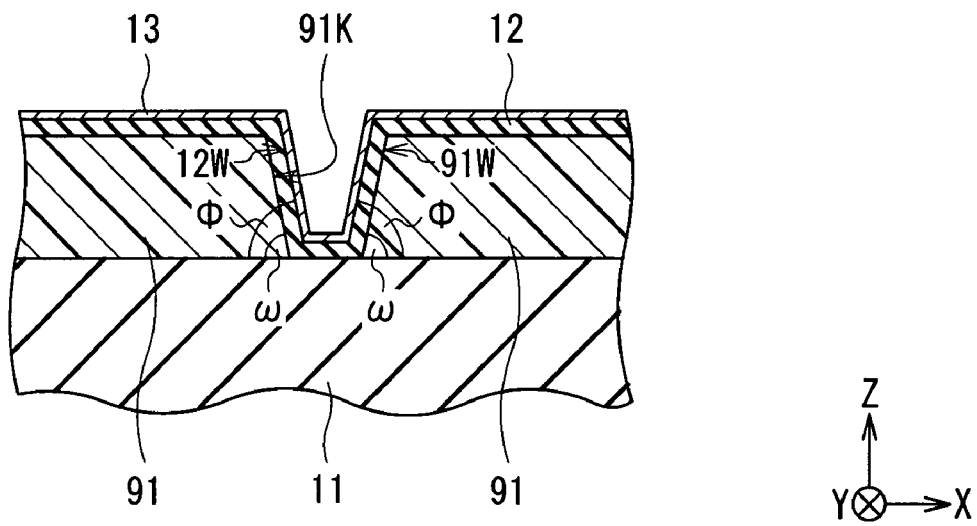
FIG. 8 is a sectional view for explaining the next following step of that shown in FIG. 7.
Figure 9:
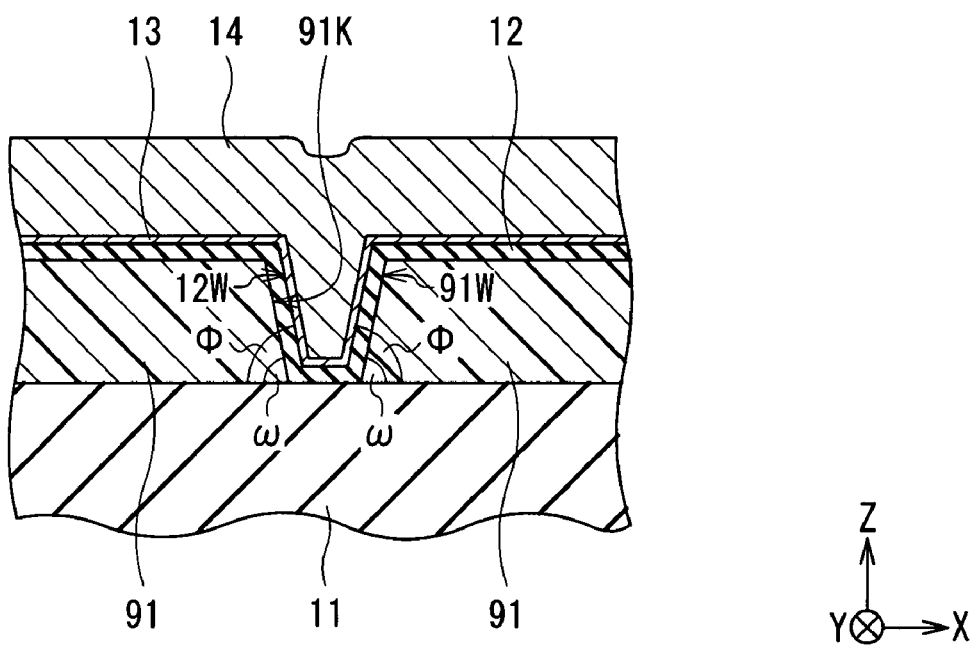
FIG. 9 is a sectional view for explaining the next following step of that shown in FIG. 8.

Subsequently, a magnetic layer for forming a main magnetic pole layer 40 is formed so as to bury at least the opening part 91K provided with the non-magnetic layer 12. Specifically, for example, a seed layer 13 is formed on the non-magnetic layer 12 by sputtering method, as shown in FIG. 8, and a plating film is then grown by using the seed layer 13 as an electrode film, as shown in FIG. 9, so that a plating layer 14 can be formed on the seed layer 13 so as to bury the opening part 91K.

Figure 10:
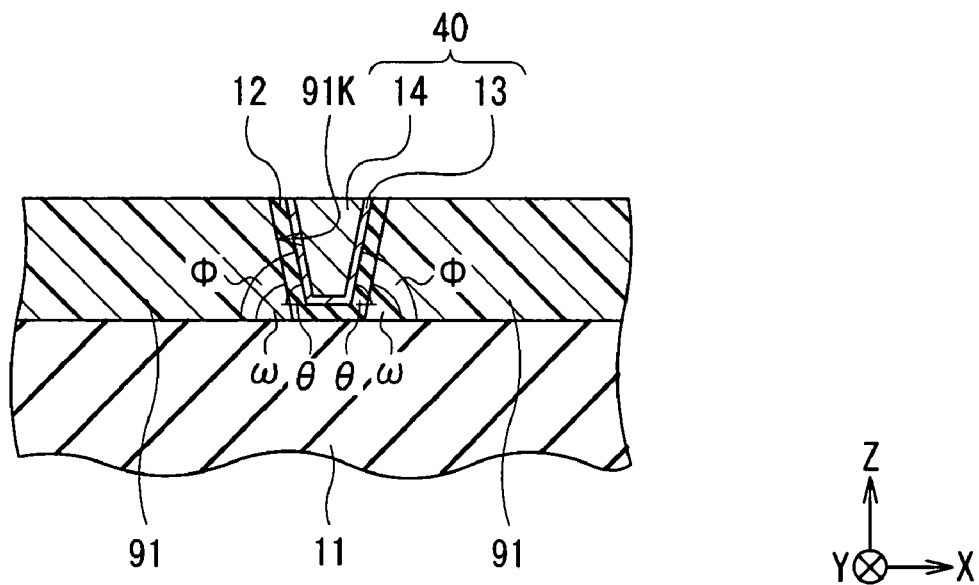
FIG. 10 is a sectional view for explaining the next following step of that shown in FIG. 9.

Subsequently, as shown in FIG. 10, the main magnetic pole layer 40 as a magnetic layer pattern is formed so as to bury the opening part 91K provided with the non-magnetic layer 12 by selectively removing the non-magnetic layer 12, the seed layer 13, and the plating layer 14 until at least the photoresist pattern 91 is exposed. For example, the non-magnetic layer 12, the seed layer 13, and the plating layer 14 can be removed by a polishing method such as CMP method, or etching method such as ion milling or reactive ion etching (RIE). When the main magnetic pole layer 40 is formed, a bevel angle θ can be determined so as to be equal to the inclination Φ of the non-magnetic layer 12, namely the bevel angle θ can be equal to the inclination ω of the photoresist pattern 91.

Figure 11:
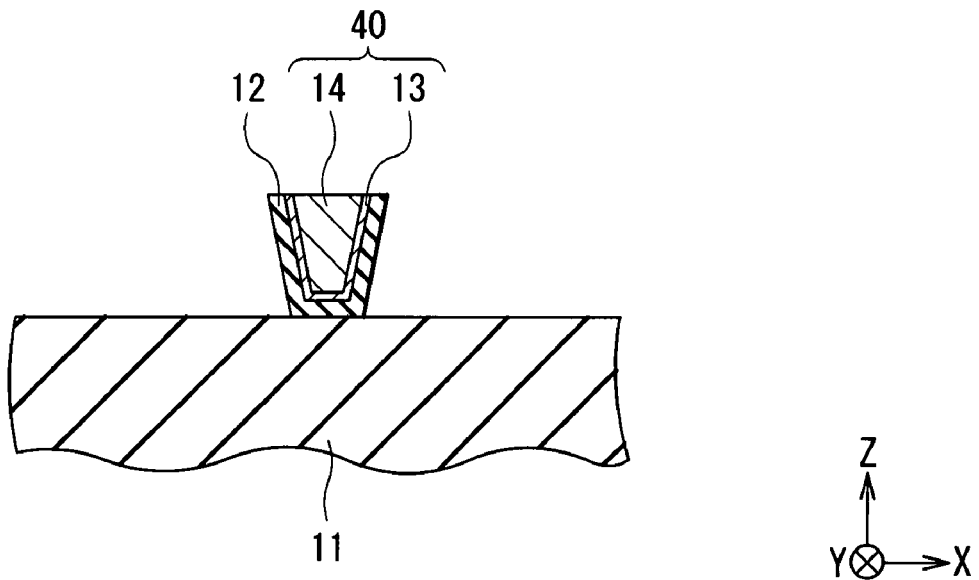
FIG. 11 is a sectional view for explaining the next following step of that shown in FIG. 10.
Figure 12:
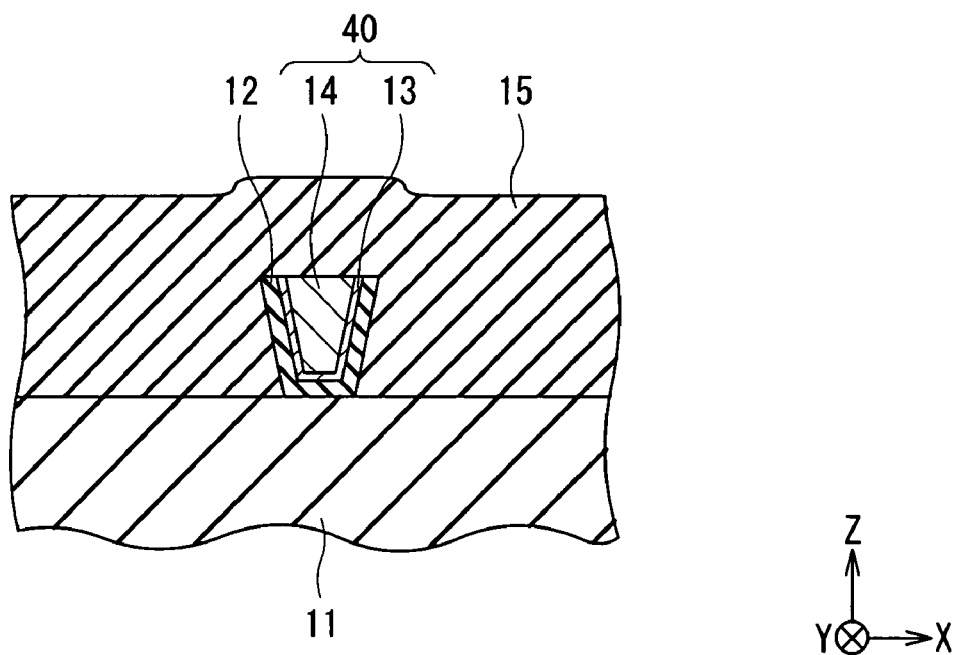
FIG. 12 is a sectional view for explaining the next following step of that shown in FIG. 11.
Figure 13:
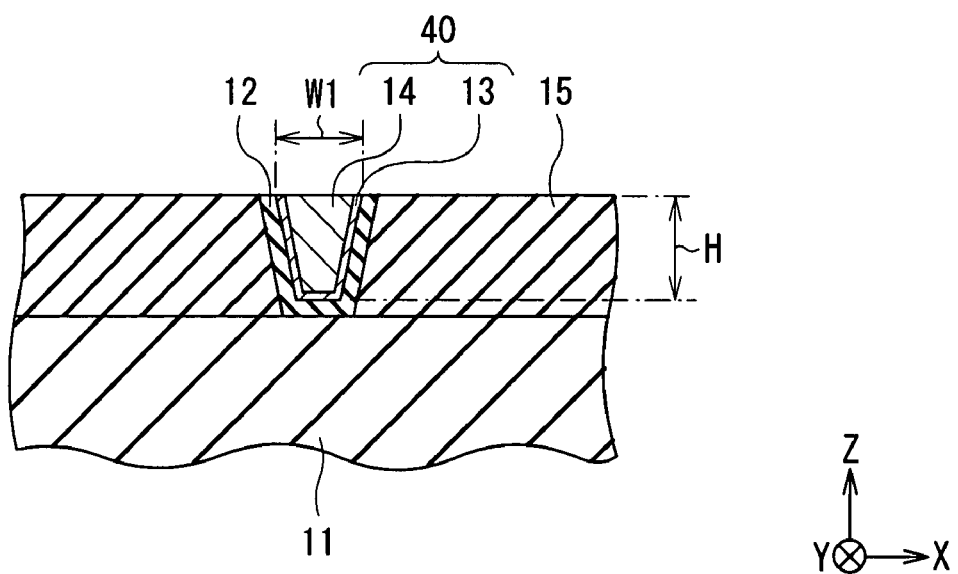
FIG. 13 is a sectional view for explaining the next following step of that shown in FIG. 12.

Subsequently, as shown in FIG. 11, the remaining photoresist pattern 91 is removed by cleaning process with an organic solvent, or ashing process, for example. Thereafter, as shown in FIG. 12, a non-magnetic layer 15 is formed so as to cover the non-magnetic layer 12 and the main magnetic pole layer 40 by sputtering method, for example. Subsequently, as shown in FIG. 13, the non-magnetic layer 15 fills the non-magnetic layer 12 and the main magnetic pole layer 40 by selectively removing (polishing) the non-magnetic layer 15 by using, for example, CMP method until at least the non-magnetic layer 12 and the main magnetic pole layer 40 are exposed. In this polishing process, for example, the amount of polishing is controlled so that the width W1 and the height H of the main magnetic pole layer 40 become desired values, respectively.

Finally, as shown in FIGS. 1A to 5, an air bearing surface 70 is formed in a post-process, and an end surface 40M of the main magnetic pole layer 40 and an end surface 60M of the magnetic layer 60 are formed. When forming the air bearing surface 70, for example, the process condition such as the polishing condition is adjusted to generate a difference in hardness between the main magnetic pole layer 40 and the non-magnetic layers 12 and 15. By virtue of this difference, the non-magnetic layer 12 can be recessed from the non-magnetic layer 15, and the main magnetic pole layer 40 can projects from the non-magnetic layer 12, thus enabling the end surface 40M to be located on the air bearing surface 70, as shown in FIG. 4. This completes the key part of the thin film magnetic head.

In the thin film magnetic head according to the present embodiment, the non-magnetic layer 12 contains no inert gas because it has been formed by the ALD method or the like, whereas the non-magnetic layer 15 contains inert gas because it has been formed by sputtering method or the like. Consequently, the operating characteristics can be stabilized for the following reason.

Figure 14:
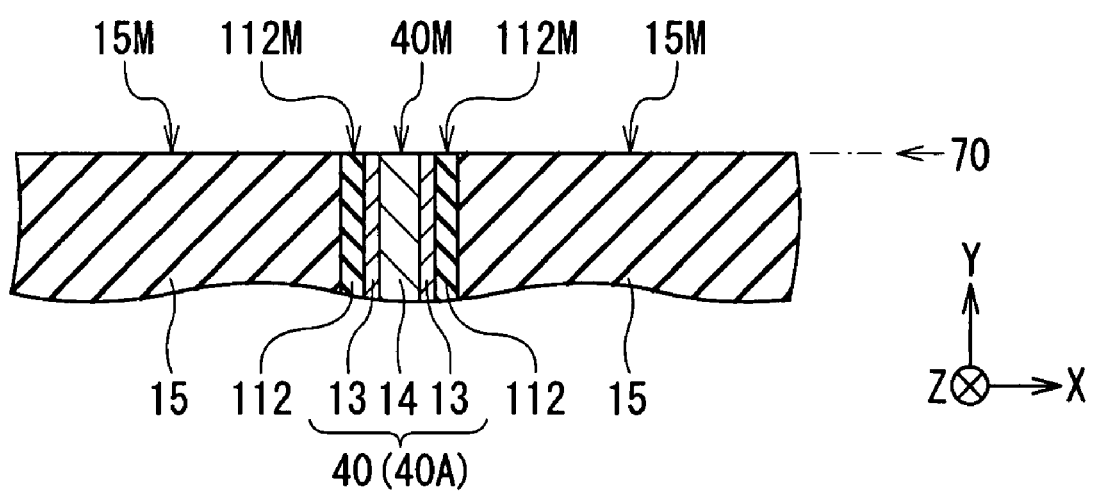
FIG. 14 is a sectional view for explaining the configuration of a thin film magnetic head as a comparative example of the thin film magnetic head according to the preferred embodiment of the present invention.

FIG. 14 shows the configuration of a thin film magnetic head of a comparative example, particularly showing the sectional configuration corresponding to that in FIG. 4. The thin film magnetic head of the comparative example has the same configuration as the thin film magnetic head according to the present embodiment except that, like the non-magnetic layer 15, a non-magnetic layer 112 corresponding to the non-magnetic layer 12 is formed by sputtering method, and therefore the non-magnetic layer 112 is not recessed from the non-magnetic layer 15. In FIG. 14, there is shown the case where an end surface 112M of the non-magnetic layer 112 is located on the air bearing surface 70.

In the comparative example, the non-magnetic layer 112 cannot be recessed from the non-magnetic layer 15 as shown in FIG. 14, because both of the non-magnetic layers 112 and 15 are formed by sputtering method or the like, thereby producing no difference in hardness between the two. In this case, the non-magnetic layer 112 surrounds throughout the periphery of a front end portion 40A, and the area where the non-magnetic layer 112 contacts with the front end portion 40A can be maximized. Therefore, the non-magnetic layer 112 exerts too much influence of the residual stress on the front end portion 40A, so that the magnetic domain structure of the front end portion 40A is susceptible to fixation (so-called domain lock). As the result, the magnetic domain structure of the front end portion 40A may be changed from the initial state of the main magnetic pole layer 40. When the magnetic domain of the front end portion 40A is fixed, the residual magnetic flux of the main magnetic pole layer 40 is liable to leak through the front end portion 40A during the time of non-recording, and hence the probability of occurrence of pole eraser is increased.

In contrast, in the present embodiment, the non-magnetic layer 12 can be recessed from the non-magnetic layer 15 as shown in FIG. 4, because the non-magnetic layer 12 is formed by ALD method or the like, and the non-magnetic layer 15 is formed by sputtering method or the like, thus producing a difference in hardness between the two. In this case, only the rear portion of the front end portion 40A is surrounded by the non-magnetic layer 12, and the forward portion thereof is not surrounded by the non-magnetic layer 12. Consequently, the area where the non-magnetic layer 12 contacts with the front end portion 40A is smaller than that in the comparative example. Therefore, the residual stress of the non-magnetic layer 12 to be exerted on the front end portion 40A can be reduced, and the magnetic domain structure of the front end portion 40A is unsusceptible to fixation. Therefore, the forward portion of the front end portion 40A as being the substantial magnetic flux releasing part is unsusceptible to the influence of the residual stress of the non-magnetic layer 12 (so-called stress-free state), and the initial magnetic pole structure of the main magnetic pole layer 40 can be maintained easily. As the result, the residual magnetic flux of the main magnetic pole layer 40 is less liable to leak during the time of non-recording, resulting in a low probability of occurrence of pole eraser. Consequently, in accordance with the present embodiment, suppressing the occurrence of pole eraser can stabilize the operating characteristics such as recording performance.

Additionally, in the method of manufacturing a thin film magnetic head according to the present embodiment, the main magnetic pole layer 40 (the front end portion 40A) is formed at the opening part 91K by the following steps of: (i) forming the photoresist pattern 91 having the opening part 91K; (ii) forming the non-magnetic layer 12 so as to narrow the opening part 91K; (iii) stacking the seed layer 13 and the plating layer 14 so as to bury the opening part 91K provided with the non-magnetic layer 12; and (iv) selectively removing the non-magnetic layer 12, the seed layer 13, and the plating layer 14 until the photoresist pattern 91 is exposed. In this case, the non-magnetic layer 12 can be formed to narrow the opening part 91K by using the dry film forming method excellent in film thickness controllability. This allows the final opening width (the forming width of the front end portion 40A) to be less susceptible to variations than the case of the related art using the insoluble layer whose film thickness is hard to control. Thus, substantially the same accuracy as in photolithography method can be ensured, and the trailing edge width W1 can be miniaturized to such a width (about 0.2 µm or below) as not to be achievable with the photolithography method. Since the formation of the main magnetic pole layer 40 requires only the step of forming the non-magnetic layer 12 as a film forming process, the number of steps can be reduced than the case of the related art requiring the step of forming the release film in addition to the step of forming the additional film. This simplifies the process of forming the main magnetic pole layer 40. Hence, the manufacturing process of the thin film magnetic head can be performed with high accuracy and simplified.

Figure 15:
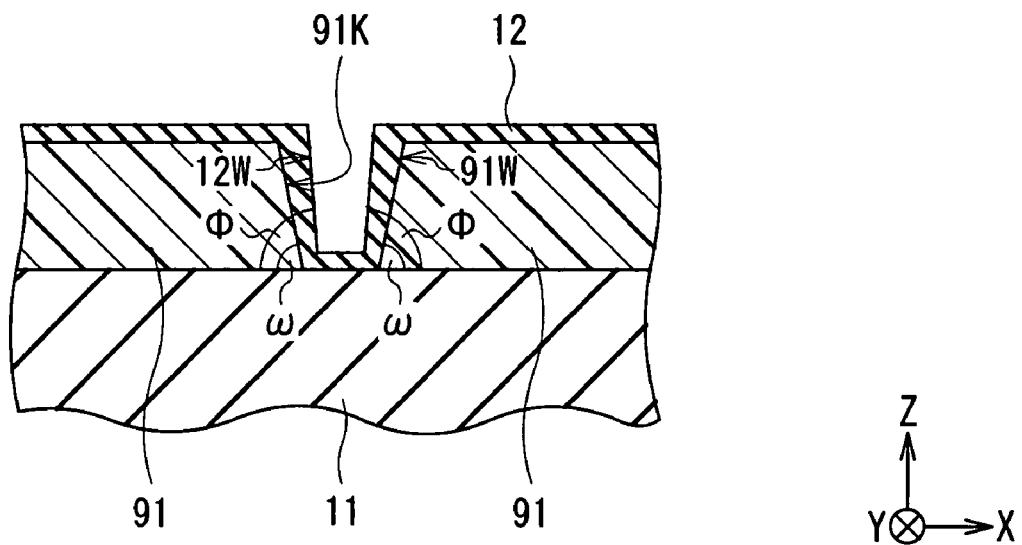
FIG. 15 is a sectional view for explaining a manufacturing process of a thin film magnetic head when a non-magnetic layer is formed by a method other than ALD method.
Figure 16:
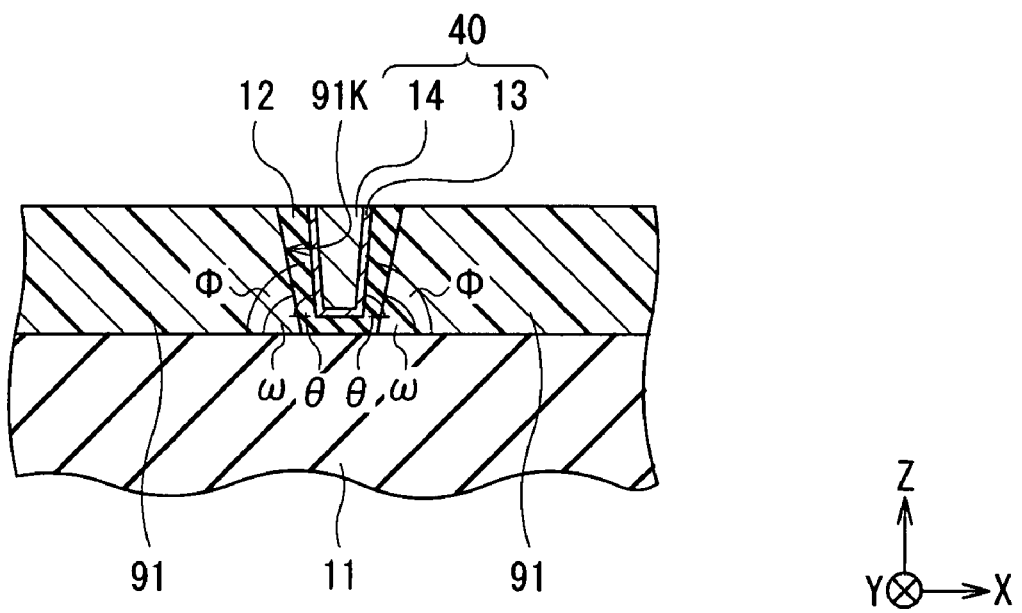
FIG. 16 is a sectional view for explaining the next following step of that shown in FIG. 15.

Especially in the present embodiment, by using the ALD method to form the non-magnetic layer 12, the main magnetic pole layer 40 can be formed with higher accuracy for the following reason. FIGS. 15 and 16 show the sectional configurations corresponding to those of FIGS. 7 and 10, respectively. Specifically, FIGS. 15 and 16 are for purposes of explaining a manufacturing process of a thin film magnetic head by a method other than the ALD method (for example, sputtering method or CVD (chemical vapor deposition) method), as a method of forming the non-magnetic layer 12.

With the method other than the ALD method, when a non-magnetic layer 12 is formed so as to cover an inner wall 91W of a photoresist pattern 91 as shown in FIG. 15, the thickness of the non-magnetic layer 12 may be changed along the inner wall 91W depending on the depth or the inclination co of an opening part 91K, and therefore the inclination Φ might deviate from the inclination ω. As an example of the change of the thickness, it can be assumed, for example, that the thickness of the non-magnetic layer 12 is gradually increased as it is spaced apart from the non-magnetic layer 11. In this case, the bevel angle θ deviates from the inclination ω, as shown in FIG. 16, and therefore, the trailing edge width W1 and the bevel angle θ may deviate from desired values, respectively. Although the accuracy of determining the trailing edge width W1 and the bevel angle θ can be higher than that in the related art, it might not be sufficient under the manufacturing specification requiring a strict accuracy.

In contrast, with the ALD method, the thickness of the non-magnetic layer 12 can be uniformed along the inner wall 91 as shown in FIG. 7, and hence the inclination Φ can be equal to the inclination ω. In this case, since the bevel angle θ is equal to the inclination ω as shown in FIG. 10, the trailing edge width W1 and the bevel angle θ agree with desired values, respectively. Consequently, under the control of the bevel angle θ based on the inclination ω, the accuracy of determining the trailing edge width W1 and the bevel angle θ can be enhanced sufficiently, thereby enabling the main magnetic pole layer 40 to be formed with higher accuracy.

In this case, especially by controlling so that the film forming temperature of the ALD method is lower than the glass transition temperature of the photoresist pattern 91, the photoresist pattern is unsusceptible to deformation in the step of forming the non-magnetic layer 12. This avoids that the shape of the photoresist pattern 91 is collapsed due to foaming phenomenon, or the inclination ω is changed from the initial value due to flow phenomenon. Also from this viewpoint, the main magnetic pole layer 40 can be formed with high accuracy.

The followings are the technical significances of the use of the ALD method in the present invention. Generally, in the field of forming an insulating layer where physical characteristic such as dielectric strength is strictly required, the film forming temperature of the ALD method is set to a high temperature of about 150° C. or above in order to suppress the possibility of occurrence of pinholes, with regard for film compactness. This temperature condition is set for the purpose of sufficiently increasing film compactness according to the required physical characteristic. On the other hand, the present invention calls for only the film thickness controllability of the non-magnetic layer 12 in order to narrow the opening part 91K, while controlling the inclination Φ to be equal to the inclination ω, as shown in FIG. 7. Hence, the film forming temperature of the ALD method is set to be lower than the above-mentioned general film forming temperature (about 150° C. or above). That is, setting the film forming temperature to somewhat a low value may cause no problem because the intended use of the non-magnetic film 12 requires only sufficient film thickness controllability, even if film compactness is somewhat low. More specifically, though the film compactness of the non-magnetic layer 12 will be lowered by setting the film forming temperature to a low value, it goes without saying that the non-magnetic layer 12 can have film compactness within a practically permissible range as long as the ALD method is used. Hence, the present invention is significant in the point of setting the film forming temperature of the ALD method to a lower value than the general film forming temperature, in order to control the trailing edge width W1 and the bevel angle θ.

Although in the present embodiment, as shown in FIG. 4, the end surface 40M of the main magnetic pole layer 40 is located on the air bearing surface 70 together with the end surface 15M of the non-magnetic layer 15, without limiting to this, the position of the main magnetic pole layer 40 can be set arbitrarily as long as the main magnetic pole layer 40 is advanced than the non-magnetic layer 12. This also provides the same effect as in the foregoing embodiment.

Figure 17:
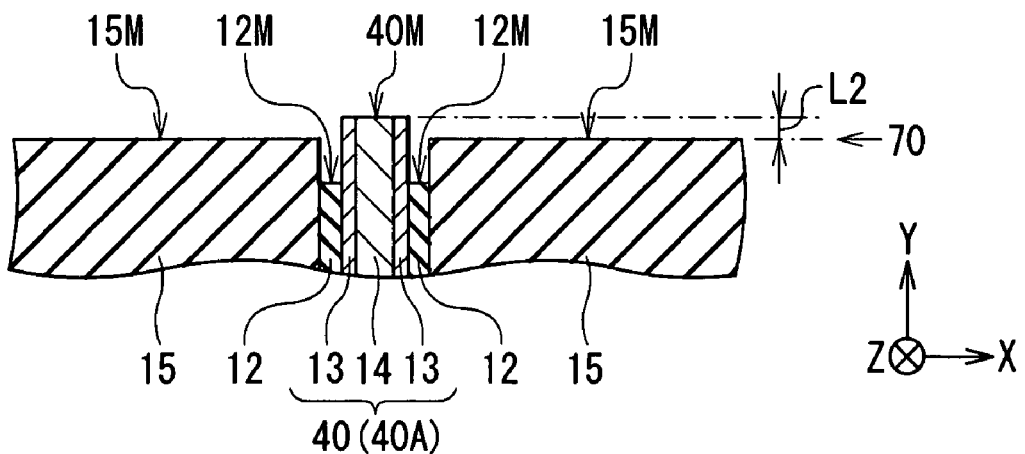
FIG. 17 is a sectional view showing a modification in the configuration of the thin film magnetic head according to the preferred embodiment of the present invention.

Specifically, as shown in FIG. 17 corresponding to FIG. 4, the main magnetic pole layer 40 may project from the non-magnetic layer 15. A distance L2 of projection of the main magnetic pole layer 40 (the distance between the air bearing surface 70 and the end surface 40M of the main magnetic pole layer 40) can be set arbitrarily. As an example, it is about a several nm. Especially, as compared with the case shown in FIG. 4, the rate of contact of the non-magnetic layer 12 with the front end portion 40A can be reduced by the amount of projection of the main magnetic pole layer 40, thereby increasing the rate of stress free portion in the front end portion 40A. This further suppresses the probability of occurrence of pole eraser.

Figure 18:
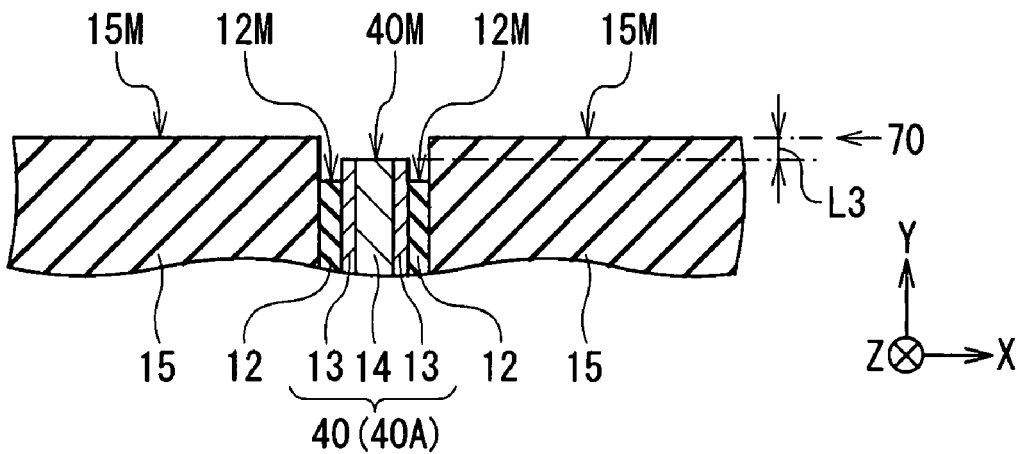
FIG. 18 is a sectional view showing other modification in the configuration of the thin film magnetic head according to the preferred embodiment of the present invention.

Alternatively, as shown in FIG. 18 corresponding to FIG. 4, the main magnetic pole layer 40 may be recessed from the non-magnetic layer 15. A distance L3 of recessing of the main magnetic pole layer 40 (the distance between the air bearing surface 70 and the end surface 40M of the main magnetic pole layer 40) can be set arbitrarily. As an example, it is about a several nm. Especially, as compared with the case shown in FIGS. 4 and 17, because the main magnetic pole layer 40 is retreated than the air bearing surface 70, the probability of the main magnetic pole layer 40 will strike the recording medium 80 can be reduced when using the thin film magnetic head by mounting it on a magnetic recording system such as a hard disk drive. This enables the operating characteristics of the magnetic recording system to be further improved.

In the present embodiment, the polishing process when polishing the non-magnetic layer 15 is used to determine the width W1 and the height H of the main magnetic pole layer 40, as shown in FIGS. 12 and 13. Without limiting to this, for example, the polishing process when forming the plating layer 14 or the like may be used to determine the width W1 and the height H, as shown in FIGS. 9 and 10. This also provides the same effect.

Figure 19:
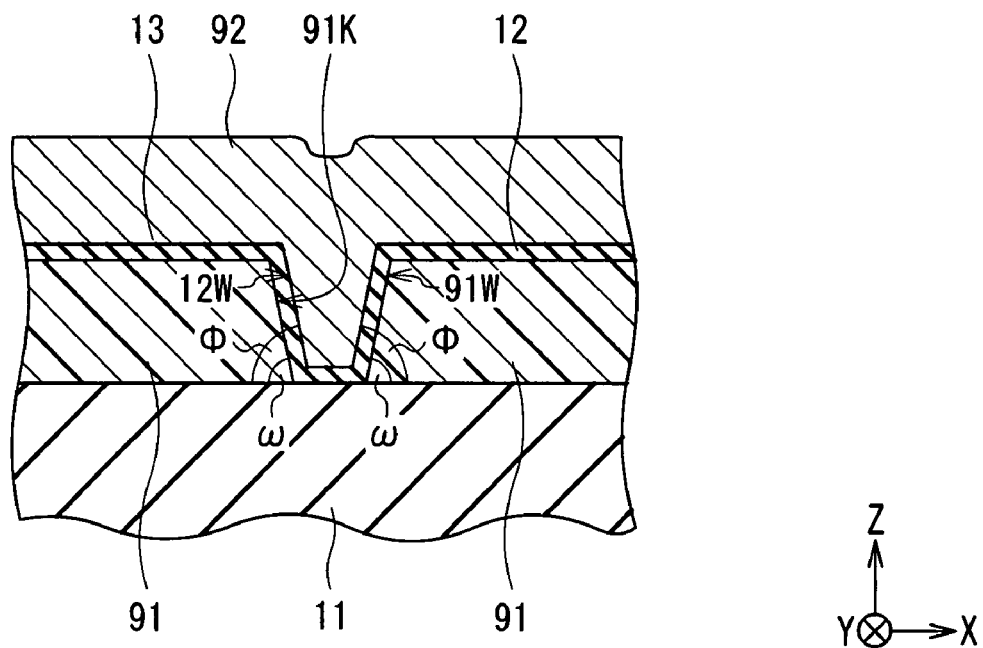
FIG. 19 is a sectional view for explaining a manufacturing step in a modification of the method of manufacturing a thin film magnetic head according to the preferred embodiment of the present invention.
Figure 20:
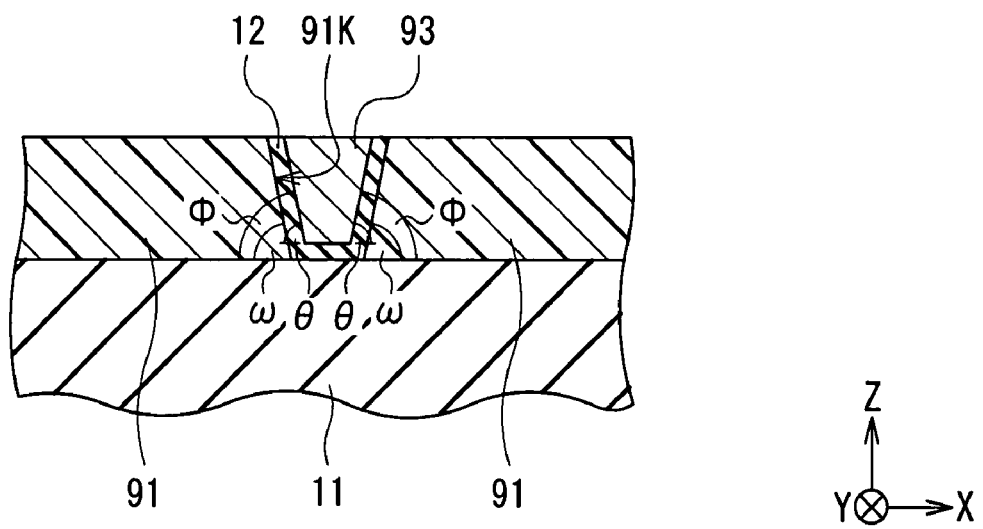
FIG. 20 is a sectional view for explaining the next following step of that shown in FIG. 19.

In the present embodiment, the main magnetic pole layer 40 including the seed layer 13 and the plating layer 14 is formed as shown in FIGS. 8 to 11. Without limiting to this, for example, as shown in FIGS. 19 and 20 corresponding to FIGS. 9 and 10, respectively, a main magnetic pole layer 93 may be formed instead of the main magnetic pole layer 40, by forming on a non-magnetic layer 12 a magnetic layer 92 instead of the seed layer 13 and the plating layer 14, by sputtering method or CVD method, and then selectively removing the non-magnetic layer 12 and the magnetic layer 92 until a photoresist pattern 91 is exposed. This also provides the same effect.

Figure 21:
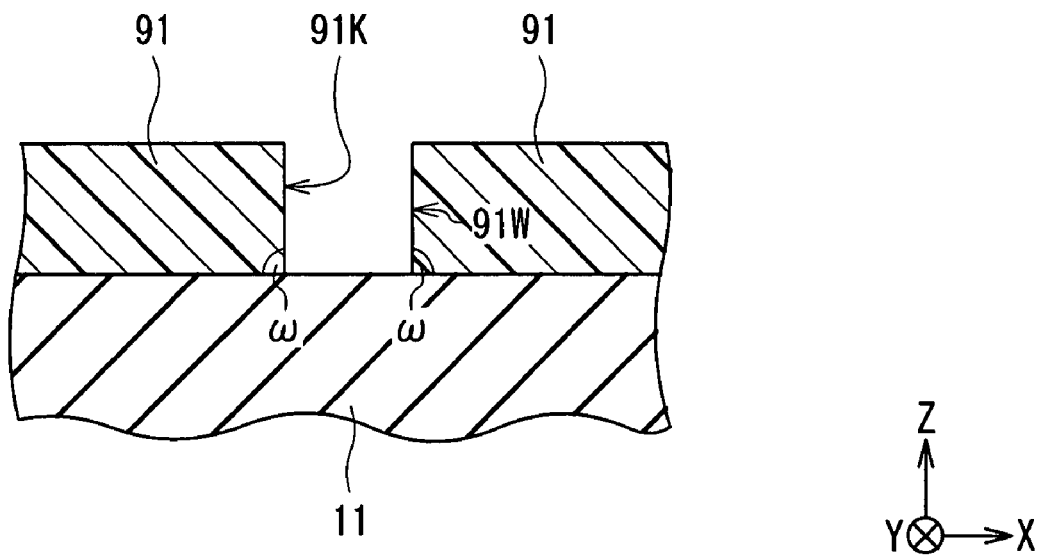
FIG. 21 is a sectional view for explaining a manufacturing step in other modification of the method of manufacturing a thin film magnetic head according to the preferred embodiment of the present invention.
Figure 22:
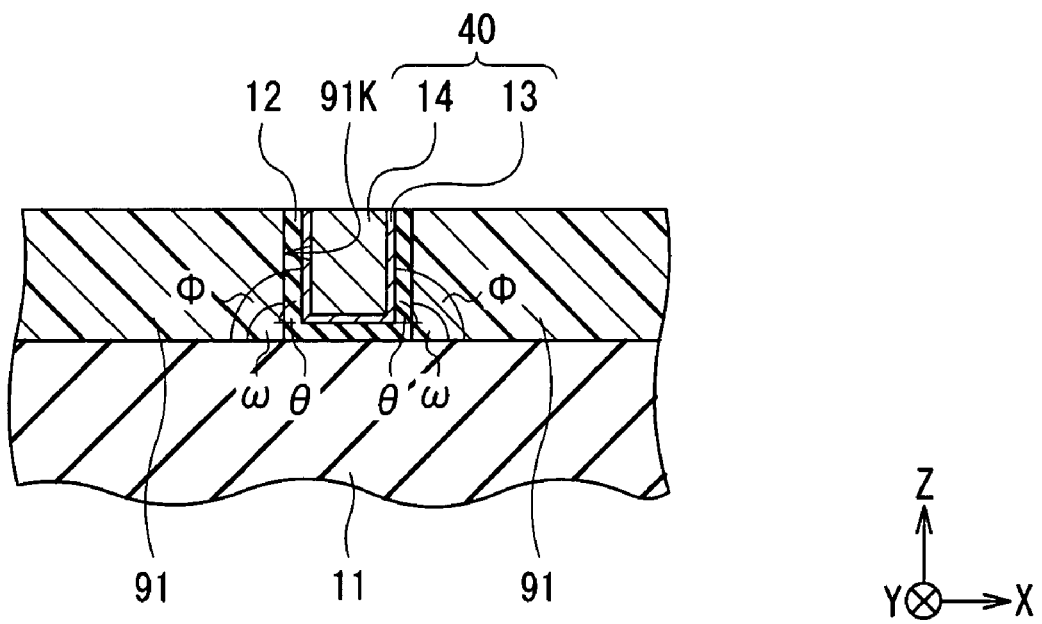
FIG. 22 is a sectional view for explaining the next following step of that shown in FIG. 21.

In the present embodiment, the main magnetic pole layer 40 is formed so as to have the sectional shape of the reverse trapezoidal shape as shown in FIG. 10, by forming the photoresist pattern 91 so that the inner wall 91W is inclined to the surface of the non-magnetic layer 11 (an inclination ω<90°), as shown in FIG. 6. Without limiting to this, for example, the main magnetic pole layer 40 may be formed so as to have a rectangular sectional shape as shown in FIG. 22 corresponding to FIG. 10, by forming the photoresist pattern 91 so that the inner wall 91W is orthogonal to the surface of the non-magnetic layer 11 (an inclination ω=90°), as shown in FIG. 21 corresponding to FIG. 6. This also provides the same effect.

Figures 23A, 23B:
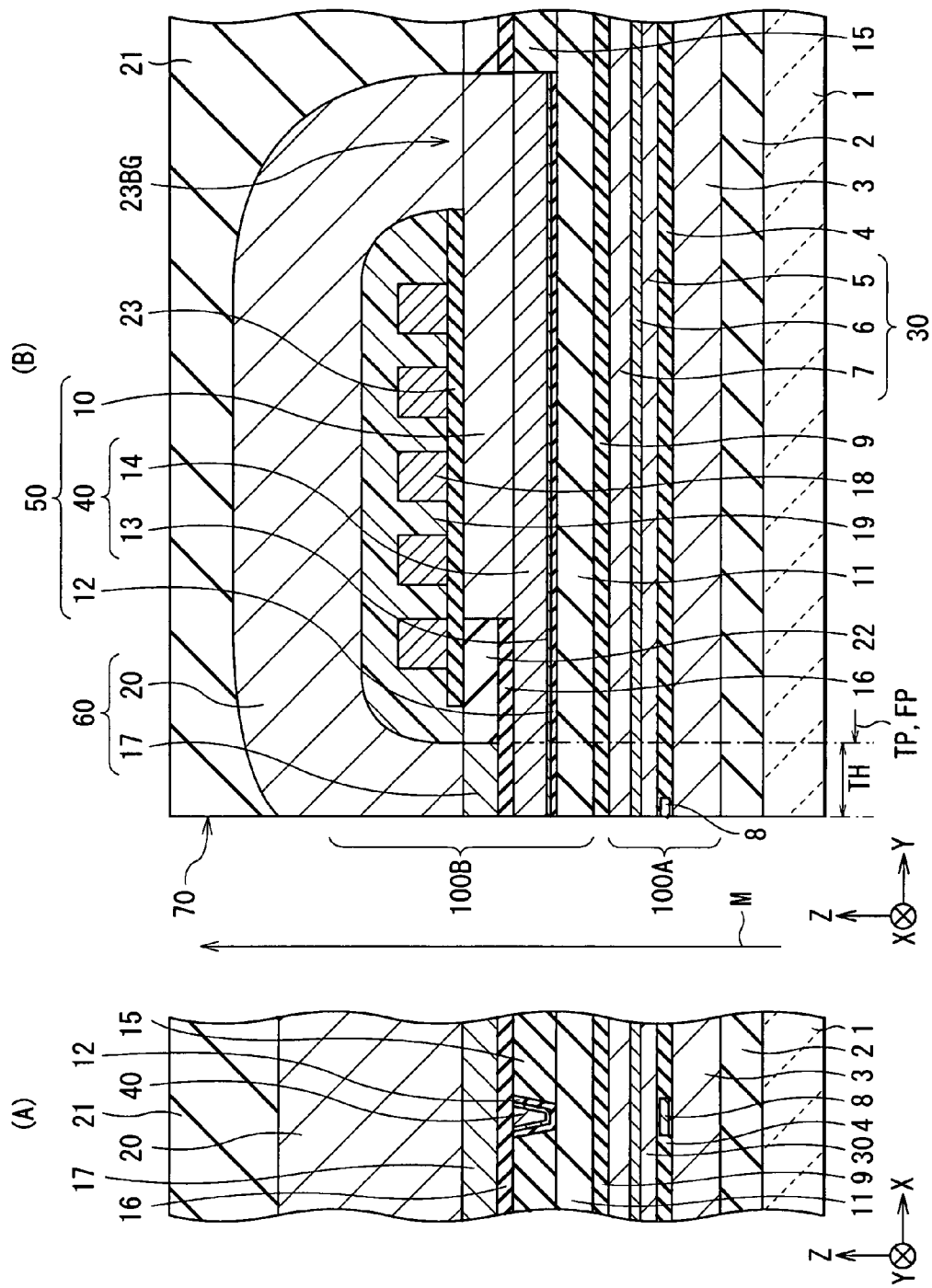
FIGS. 23A and 23B are sectional views showing a still other modification in the configuration of the thin film magnetic head according to the preferred embodiment of the present invention.

In the present embodiment, the auxiliary magnetic pole layer 10 is located on the leading side with respect to the main magnetic pole layer 40, as shown in FIGS. 1A and 1B. Without limiting to this, for example, the auxiliary magnetic pole layer 10 may be located on the trailing side with respect to the main magnetic pole layer 40, as shown in FIGS. 23A and 23B corresponding to FIGS. 1A and 1B, respectively. In this case, the auxiliary magnetic pole layer 10 can be located on the main magnetic pole layer 40, so that a gap layer 16 can be partially removed in the range where the auxiliary magnetic pole layer 10 is located. Further, a non-magnetic layer 22 for substantially defining a throat height zero position TP can fill the auxiliary magnetic pole layer 10, and an insulating layer 23 for electrically separating a thin film coil 18 from the auxiliary magnetic pole layer 10 can be disposed between the auxiliary magnetic pole layer 10 and the thin film coil 18. For example, the non-magnetic layer 22 and the insulating layer 23 can be formed of the same non-magnetic insulating material as the non-magnetic layers 11 and 15. A return yoke layer 20 can be connected to the auxiliary magnetic pole layer 10 in the rear. Preferably, the surfaces of the auxiliary magnetic pole layer 10, a light shield layer 17, and the insulating layer 22 are planarized. Like the main magnetic pole layer 40, the non-magnetic layer 12 may extend, for example, to a back gap 23BG. This also provides the same effect.

Figure 24:
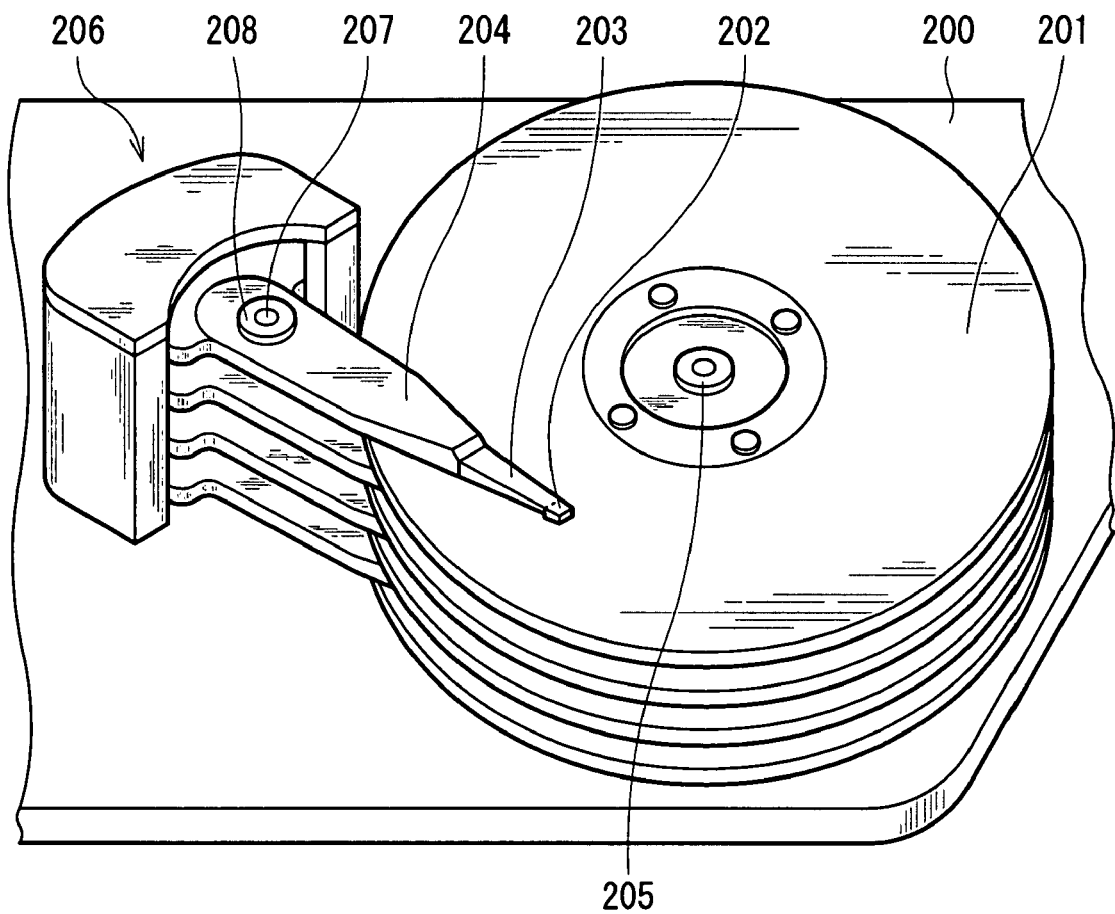
FIG. 24 is a perspective view showing the perspective configuration of a magnetic recording system equipped with the thin film magnetic head according to the preferred embodiment.
Figure 25:
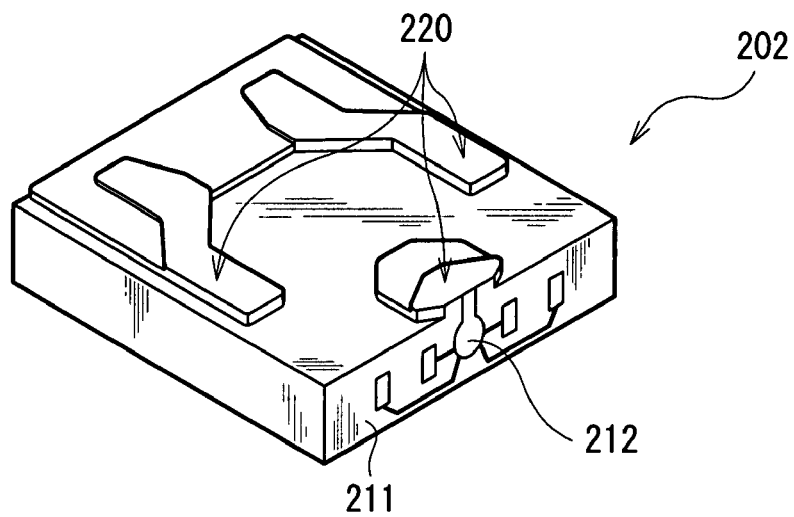
FIG. 25 is a perspective view showing in enlarged dimension the perspective configuration of a key part of the magnetic recording system shown in FIG. 24.

Next, the configuration of a magnetic recording system equipped with the perpendicular magnetic recording head of the present invention will be described below. FIGS. 24 and 25 show the configuration of the magnetic recording system. Specifically, FIG. 24 shows a perspective configuration thereof, and FIG. 25 shows in enlarged dimension the perspective configuration of a key part thereof. This magnetic recording system is one equipped with the above-mentioned thin film magnetic head, for example, a hard disk drive.

As shown in FIG. 24, for example, this magnetic recording system has, in the inside of a casing 200, a plurality of magnetic disks (for example, hard disks) 201 corresponding to the recording medium 80, in which information can be magnetically recorded (refer to FIG. 5), a plurality of suspensions 203 each supporting on one end portion thereof a magnetic head slider 202, and a plurality of arms 204 each supporting the other end portion of each of the suspensions 203. The magnetic disks 201 are rotatable around a spindle motor 205 fixed to the casing 200. The arms 204 are connected to a driving part 206 as a power source, and are revolvable through a bearing 208 around a fixed shaft 207 fixed to the casing 200. For example, the driving part 206 can be constructed by including a driving source such as a voice coil motor. This magnetic recording system is, for example, a model where the plurality of arms 204 are integrally revolvable around the fixed shaft 207. FIG. 24 shows with the casing 200 partially broken away to expose the internal structure of the magnetic recording system.

As shown in FIG. 25, the magnetic head slider 202 has such a structure that a thin film magnetic head 212 performing both recording process and reproducing process is mounted on a surface of a substrate 211 having substantially a rectangular solid structure formed of a non-magnetic insulating material such as aluminium oxide titanium carbonate ($Al_2O_3 \cdot TiC$). For example, the substrate 211 has one surface (an air bearing surface 220) provided with an irregularity structure for reducing air resistance generated when the arms 204 are revolved, and a thin film magnetic head 212 is mounted on the other surface orthogonal to the air bearing surface 220 (the surface on the right near side in FIG. 25). The thin film magnetic head 212 has the above-mentioned configuration described in the foregoing embodiment. When the magnetic disks 201 are rotated during the time of recording or reproducing information, the magnetic head slider 202 can be floated from the recording surface of the magnetic disks 201 by using the air flow generated between the recording surface of the magnetic disks 201 (the surface opposed to the magnetic head slider 202) and the air bearing surface 220. FIG. 25 shows with the state shown in FIG. 24 upside down to expose the configuration on the air bearing surface 220 side in the magnetic head slider 202.

In this magnetic recording system, the magnetic head slider 202 can be shifted to a predetermined region (a recording region) of the magnetic disks 201, by the revolution of the arm 204 during the time of recording or reproducing information. When energized the thin film magnetic head opposing to the magnetic disk 201, the thin film magnetic head 212 can be operated based on the above-mentioned principle of operation, so that the thin film magnetic head 212 performs recording process or reproducing process to the magnetic disks 201.

Since the magnetic recording system is equipped with the above-mentioned thin film magnetic head, the operating characteristic of the magnetic recording system can be stabilized, and the manufacturing process thereof can be performed with high accuracy and simplified.

EXAMPLES

An example of the present invention will be described below.

Figure 26:
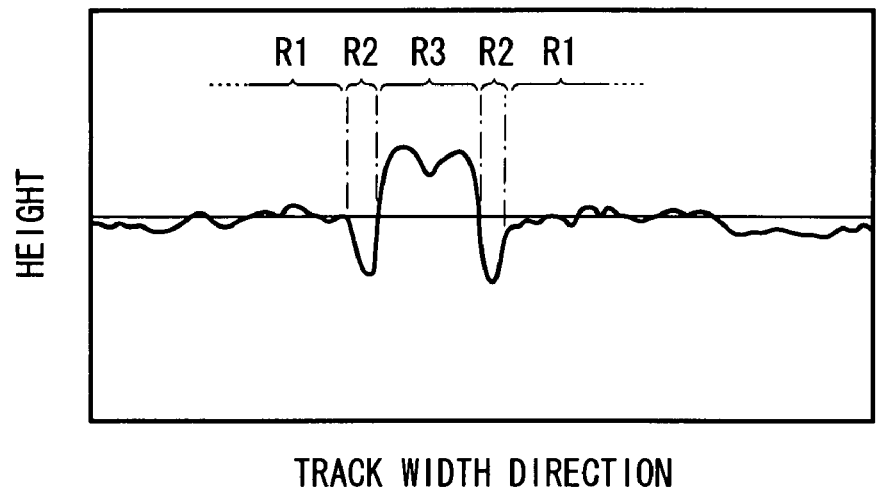
FIG. 26 is a diagram showing the result of observation of the surface structure in the vicinity of an air bearing surface observed by using an AFM.

Firstly, as a representative of the above-mentioned series of perpendicular magnetic recording heads, the surface structure of the perpendicular magnetic recording head shown in FIG. 17 was observed, and the result shown in FIG. 26 was obtained. FIG. 26 shows the surface structure in the vicinity of the air bearing surface 70 observed on an AFM, on which the abscissa and the ordinate represent position and height in a track width direction, respectively. The term "position in the track width direction" means the position in the X-axis direction shown in FIG. 17. In the observation of the surface structure, there were used alumina as the material for forming the non-magnetic layers 12 and 15, iron cobalt alloy (FeCo) as the material for forming the seed layer 13, and iron nickel alloy (FeNi) as the material for forming the plating layer 14, respectively. There were used ALD method as the method of forming the non-magnetic layer 12, and sputtering method as the method of forming the non-magnetic layer 15, respectively.

As shown in FIG. 26, on the surface in the vicinity of the air bearing surface 70, a region R1 for forming the non-magnetic layer 15 is substantially flat, whereas a region R2 for forming a non-magnetic layer 12 is recessed, and a region R3 for forming the main magnetic pole layer 40 is projected. This result shows that, though both of the non-magnetic layers 12 and 15 are formed of a hard oxide, the non-magnetic layer 15 formed by the sputtering method constitutes part of the air bearing surface 70, and the non-magnetic layer 12 formed by the ALD method is recessed from the air bearing surface 70, whereas the main magnetic pole layer 40 projects from the air bearing surface 70 because it is formed of a soft alloy. This verified that in the present invention the non-magnetic layer 12 can be retreated from the non-magnetic layer 15 after forming the air bearing surface 70, by forming the non-magnetic layer 12 with the ALD method and the non-magnetic layer 15 with the sputtering method.

Figure 27:
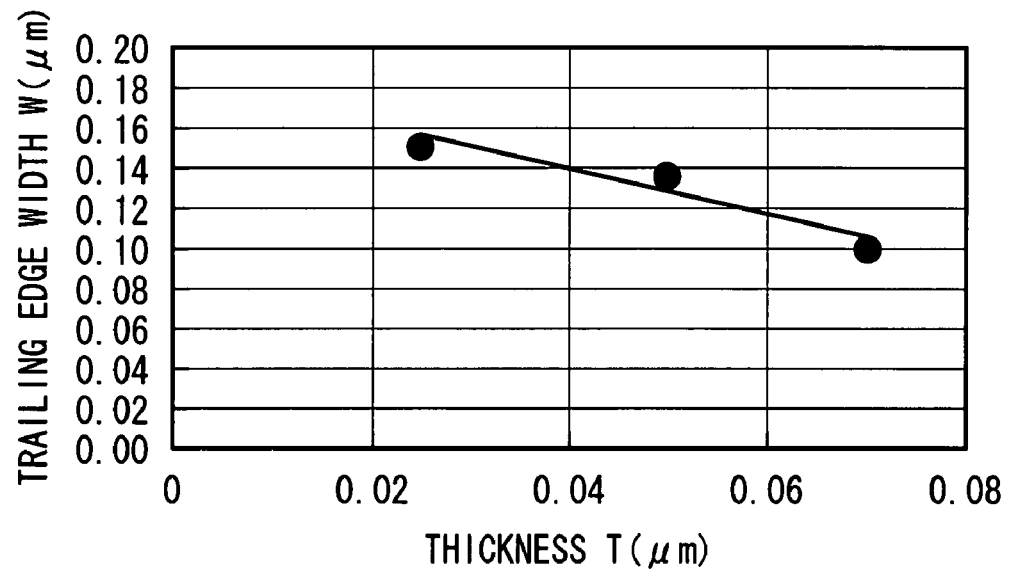
FIG. 27 is a diagram showing the correlation between non-magnetic layer thickness and trailing edge width.

Next, the trailing edge width of the main magnetic pole layer 40 formed by the above-mentioned method of manufacturing a perpendicular magnetic recording head was checked, and the result shown in FIG. 27 was obtained. FIG. 27 shows the correlation between the thickness of the non-magnetic layer 12 and the trailing edge width, on which the abscissa and the ordinate represent the thickness T (µm) of the non-magnetic layer 12 and the trailing edge width W (µm), respectively. In checking this correlation, the same materials as described in respect to FIG. 26 were used as the materials for forming the non-magnetic layer 12 and the main magnetic pole layer 40, and the trailing edge width W was determined by observing the cross section of the main magnetic pole layer 40 with FIB (focused ion beam etching) method. When forming the non-magnetic layer 12, the film forming temperature was set to 90° C. so as to be lower than the glass transition temperature of the photoresist pattern 91, and the thickness T was changed through three stages (0.024 µm, 0.05 µm, and 0.07 µm).

As can be seen from the result shown in FIG. 27, the trailing edge width W is gradually narrowed as the thickness T is increased, thus establishing substantially a proportional relationship between the thickness T and the width W. At this time, the trailing edge width W was 0.2 µm or below, specifically 0.10 µm to 0.15 µm. Although any specific photograph or the like is not shown, after forming the main magnetic pole layer 40, neither foaming nor flow was observed in the photoresist pattern 91. This verified that the present invention is capable of narrowing the trailing edge width to 0.2 µm or below by using the non-magnetic layer 12, and strictly controlling the trailing edge width.

While the present invention has been described above by taking the preferred embodiment and the example, the present invention is not limited to these, and different modifications may be made in the present invention. Specifically, in the foregoing embodiment and the example, there has been described the case where the perpendicular magnetic recording head of the present invention is applied to the shield type head. Without limiting to this, for example, it may be applied to a so-called single magnetic pole type head. Although the perpendicular magnetic recording head of the present invention is applied to the composite type head, without limiting to this, it may be applied to a recording dedicated head not equipped with a reproducing head. The applications to these cases also provide the same effect.

Although in the foregoing embodiment and the example, the magnetic device and the method of forming a magnetic layer pattern of the present invention are applied to the perpendicular magnetic recording head and the manufacturing method thereof, without limiting to this, these may be applied to other different devices and manufacturing methods thereof. Examples of the different devices are thin film inductors, thin film sensors, thin film actuators, semiconductor devices, and devices equipped with these. The applications to these cases also provide the same effect.

The shape of the opening part disposed in the photoresist pattern in the method of forming a magnetic layer pattern of the present invention can be set arbitrarily according to the shape of the magnetic layer pattern. As an example, the shape of the opening part may be circle or the like. This also provides the same effect.

The magnetic device and the method of forming a magnetic layer pattern of the present invention are applicable to methods of manufacturing a perpendicular magnetic recording head, a magnetic recording system, and a perpendicular magnetic recording head.

It should be understood by those skilled in the art that various modifications, combinations, sub-combinations and alterations may occur depending on design requirements and other factors insofar as they are within the scope of the appended claims or the equivalents thereof.

What is claimed is:

1. A magnetic device comprising:
   a first non-magnetic layer with U-shaped cross section, the U-shaped cross section including a bottom surface with two sides extending away from the bottom surface and terminating at a top surface of a magnetic layer, the magnetic layer filling inside of the first non-magnetic layer; and a second non-magnetic layer formed outside of the first non-magnetic layer, wherein, in a direction to cross over the U-shaped cross section of the first non-magnetic layer, the first non-magnetic layer is recessed from the second non-magnetic layer with respect to an air bearing surface, and the magnetic layer projects from the first non-magnetic layer with respect to the air bearing surface.

2. The magnetic device according to claim 1, wherein the magnetic layer includes a seed layer and a plating layer formed on the seed layer.

3. The magnetic device according to claim 1, wherein the first non-magnetic layer is formed by ALD (atomic layer deposition) method.

4. A magnetic device according to claim 1, wherein the first non-magnetic layer contains no inert gas; and the second non-magnetic layer, formed outside of the first non-magnetic layer, contains inert gas.

5. The magnetic device according to claim 1, wherein the magnetic layer is recessed from the second non-magnetic layer.

6. The magnetic device according to claim 1, wherein the magnetic layer projects from the second non-magnetic layer.

7. A perpendicular magnetic recording head comprising:
a non-magnetic layer with U-shaped cross section, the U-shaped cross section including a bottom surface with two sides extending away from the bottom surface and terminating at a top surface of a magnetic layer;
a magnetic pole filling inside of the non-magnetic layer; and
a second non-magnetic layer formed outside of the first non-magnetic layer,
wherein, in a direction to cross over the U-shaped cross section of the first non-magnetic layer, the first non-magnetic layer is recessed from the second non-magnetic layer with respect to an air bearing surface, and the magnetic pole projects from the first non-magnetic layer with respect to the air bearing surface.

8. The perpendicular magnetic recording head according to claim 7, wherein,
the magnetic pole extends from an air bearing surface or its neighborhood to an area far therefrom; and
an end surface of the magnetic pole on the air bearing surface or its neighborhood is of reverse trapezoidal shape.

9. The perpendicular magnetic recording head according to claim 7, wherein the magnetic pole includes a seed layer and a plating layer formed on the seed layer.

10. The perpendicular magnetic recording head according to claim 7, wherein the non-magnetic layer is formed by ALD method.

11. A perpendicular magnetic recording head according to claim 7,
wherein the first non-magnetic layer contains no inert gas; and
the second non-magnetic layer, formed outside of the first non-magnetic layer, contains inert gas.

12. The perpendicular magnetic recording head according to claim 7, wherein the magnetic pole is recessed from the second non-magnetic layer.

13. The perpendicular magnetic recording head according to claim 7, wherein the magnetic pole projects from the second non-magnetic layer.

14. A magnetic recording system comprising:
a recording medium; and
a perpendicular magnetic recording head including:
a non-magnetic layer with U-shaped cross section, the U-shaped cross section including a bottom surface with two sides extending away from the bottom surface and terminating at a top surface of a magnetic layer;
a magnetic pole filling inside of the non-magnetic layer; and
a second non-magnetic layer formed outside of the first non-magnetic layer,
wherein, in a direction to cross over the U-shaped cross section of the first non-magnetic layer, the first non-magnetic layer is recessed from the second non-magnetic layer with respect to an air bearing surface, and the magnetic pole projects from the first non-magnetic layer with respect to the air bearing surface.

15. The magnetic recording system according to claim 14, wherein the recording medium includes a magnetization layer disposed on a side close to the perpendicular magnetic recording head and a soft magnetic layer disposed on a side far from the perpendicular magnetic recording head.

* * * * *